United States Patent
Vann et al.

(10) Patent No.: US 9,972,166 B2
(45) Date of Patent: May 15, 2018

(54) INTELLIGENT PLAYER INTERFACE MESSAGING FOR GAMING SYSTEMS

(71) Applicant: BALLY GAMING, INC., Las Vegas, NV (US)

(72) Inventors: Jamie W. Vann, Chicago, IL (US); Erik W. Funkhouser, Chicago, IL (US); Yokeshwaran Srinivasan, Chicago, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 301 days.

(21) Appl. No.: 14/865,188

(22) Filed: Sep. 25, 2015

(65) Prior Publication Data

US 2017/0092038 A1    Mar. 30, 2017

(51) Int. Cl.

| | |
|---|---|
| *G07F 17/32* | (2006.01) |
| *G06F 3/16* | (2006.01) |
| *G06F 3/01* | (2006.01) |
| *G06F 3/02* | (2006.01) |
| *G06F 3/0488* | (2013.01) |
| *H04W 4/00* | (2018.01) |

(52) U.S. Cl.
CPC ............ *G07F 17/323* (2013.01); *G06F 3/017* (2013.01); *G06F 3/0205* (2013.01); *G06F 3/0488* (2013.01); *G06F 3/16* (2013.01); *G07F 17/3206* (2013.01); *G07F 17/3209* (2013.01); *G07F 17/3211* (2013.01); *G07F 17/3213* (2013.01); *G07F 17/3227* (2013.01); *G07F 17/3244* (2013.01); *G07F 17/3286* (2013.01); *H04W 4/008* (2013.01)

(58) Field of Classification Search
CPC . G07F 17/323; G07F 17/3211; G07F 17/3213
USPC .......................................................... 463/20
See application file for complete search history.

(56) References Cited

U.S. PATENT DOCUMENTS

| | | | |
|---|---|---|---|
| 4,760,527 A | 7/1988 | Sidley | 463/13 |
| 6,554,704 B2 | 4/2003 | Nicastro et al. | 463/20 |

(Continued)

FOREIGN PATENT DOCUMENTS

AU    2014202704 B2    6/2014    ............. G07F 17/32

*Primary Examiner* — Omkar Deodhar
*Assistant Examiner* — Shauna-Kay Hall
(74) *Attorney, Agent, or Firm* — David J. Bremer

(57) ABSTRACT

A gaming system includes a plurality of input devices for operating a wagering game feature. A level of adoption is determined and dynamically modified for one or more input devices based upon player interaction during the feature. A tailored level of messaging is presented to the player corresponding to the level of adoption. A level of adoption may be maintained separately for each feature of the wagering game and for each input device. The level of adoption may be based on determined player familiarity, proficiency, desirability, usage, etc., of the input device, during one or more features of the wagering game. The level of adoption for a player, the one or more input devices, and all available feature contexts of the wagering game may evolve during a single gaming cycle session, starting at a predetermined default value and changing in response to player interaction with the input devices and operation of the gaming features. An optional player account allows information to remain persistent over multiple gaming cycles.

20 Claims, 12 Drawing Sheets

(56) References Cited

U.S. PATENT DOCUMENTS

| | | | |
|---|---|---|---|
| 6,561,898 B2 | 5/2003 | Moody | 463/12 |
| 7,878,808 B1* | 2/2011 | Stumm | G09B 5/12 434/118 |
| 8,277,314 B2 | 10/2012 | Wolf et al. | 463/29 |
| 8,454,436 B2 | 6/2013 | Klostermann et al. | 463/31 |
| 8,550,901 B2 | 10/2013 | Walker et al. | 463/25 |
| 8,662,981 B2 | 3/2014 | Allen et al. | 463/16 |
| 8,702,508 B2 | 4/2014 | Gura et al. | 463/31 |
| 9,005,003 B2 | 4/2015 | Thompson et al. | G07F 17/3209 |
| 2007/0060318 A1 | 3/2007 | O'Halloran et al. | 463/26 |
| 2008/0148165 A1* | 6/2008 | Zalewski | A63F 13/12 715/764 |
| 2009/0124323 A1 | 5/2009 | Dunn et al. | 463/17 |
| 2011/0306395 A1* | 12/2011 | Ivory | A63F 13/49 3/49 |
| 2014/0179397 A1 | 6/2014 | Thompson et al. | G07F 17/3209 |
| 2014/0179413 A1 | 6/2014 | Thompson et al. | A63F 13/06 |
| 2014/0179435 A1 | 6/2014 | Thompson et al. | A63F 13/00 |
| 2014/0206428 A1 | 7/2014 | Thompson et al. | A63F 13/06 |
| 2014/0364234 A1* | 12/2014 | Smith | G07F 17/3209 463/37 |

* cited by examiner

INTELLIGENT PLAYER INTERFACE MESSAGING FOR GAMING SYSTEMS

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming systems, apparatus, and methods and, more particularly, to intelligent user-interface messaging for aiding and improving the usage and adoption of one or more input devices with a gaming machine.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming machines and games played thereon, including the manner in which interaction with a players is leveraged. Player interaction may include user interfaces relying upon new and old input devices, using new and old input methods. A long, established history of traditional interfaces may inhibit some players from trying new input techniques and fully engaging new input devices. For example, user interfaces involving controllers using motion sensing technology may not be intuitive when a player is introduced to the system for the first time. These considerations may inhibit successful introduction of new player input devices and input methods using new player interfaces for gaming machines of modern casinos.

Also, gaming machines that utilize multiple input devices may include recurrent player-interface instructional messages (e.g., tutorials or prompts) that become irritating to players during gameplay. The repeated presentation of unnecessary, redundant, or unwanted information may annoy or repel active players. Oppositely, players with limited proficiency or familiarity of particular input methods may find tutorial instruction beneficial and desirable. Further, some players may not want to use a particular type of input device or input method at all. Further, as the level of proficiency, familiarity, and desirability of messaging changes for a player during a gaming session, a level of required or desired tutorial messaging may also evolve.

Introducing a new input device using a gesture-based interface to a player for the first time is a key moment to promote future adoption. It is very important that a player does not reject the whole game on the basis of a new interface perceived as "too complicated" or "difficult to use." Thus, finding a balance between helpful tutorial messaging and annoying interruptions is highly desirable. Thus, a method for intelligently and dynamically controlling an amount of tutorial instructional messaging is desirable. Also, the ability to control instructional message display based upon determined proficiency and/or player desirability for particular input methods enhances the player experience during use of gaming machines by minimizing unneeded or undesirable player-interface instruction and tutorial messaging.

SUMMARY OF THE INVENTION

According to one aspect of the present invention, a gaming system comprises a regulated gaming machine and game-logic circuitry. The gaming system may be incorporated into a single, freestanding gaming machine. The regulated gaming machine is primarily dedicated to playing at least one casino wagering game and includes an electronic display device, a value-input device, and a plurality of electronic input devices. The electronic input devices include a first input device and a second input device. The casino wagering game includes a first feature alternatively operable by a player using either the first input device or the second input device. The game-logic circuitry is configured to detect a physical item associated with a monetary value that establishes a credit balance via the value-input device, and initiate the casino wagering game in response to an input indicative of a wager covered by the credit balance The game-logic circuitry determines a level of adoption for the player to operate the first feature using the first input device, and in response to the first feature occurring during play of the casino wagering game, a level of tailored instructions is displayed to the player via the electronic display device, according to the level of adoption. The level of tailored instructions are related to operation of the first feature using the first input device. An input to operate the first feature is received via at least one of the first input device or the second input device. The level of adoption is modified in accordance with a manner in which the first feature is operated by the player. A cashout input that initiates a payout from the credit balance is received, via at least one of the one or more electronic input devices, concluding the wagering game.

According to another aspect of the invention, a computer-implemented method for operating a gaming system is disclosed. The gaming system included game-logic circuitry and a regulated gaming machine primarily dedicated to playing at least one casino wagering game. The gaming machine includes an electronic display device, a value-input device, and a plurality of electronic input devices. The plurality of electronic input devices includes a first input device and a second input device. The casino wagering game includes a first feature that is alternatively operable by a player using either the first input device or the second input device. The method includes detecting a physical item associated with a monetary value that establishes a credit balance via the value-input device and initiating the casino wagering game in response to an input indicative of a wager covered by the credit balance. The game-logic circuitry determines a level of adoption for the player to operate the first feature using the first input device. In response to the first feature occurring during play of the casino wagering game, a level of tailored instructions to the player is displayed via the electronic display device according to the level of adoption. The tailored instructions are related to the operation of the first feature using the first input device. An input to operate the first feature is received via at least one of the first input device or the second input device. The game-logic circuitry modifies the level of adoption in accordance with a manner in which the first feature is operated by the player. A cashout input that initiates a payout from the credit balance is received via the one or more electronic input devices, concluding the method.

According to another aspect of the invention, a computer-implemented method for operating a gaming system is disclosed. The gaming system includes game-logic circuitry and a plurality of regulated gaming machines. Each gaming machine is primarily dedicated to playing at least one respective casino wagering game and is configured to participate in a community event. Each gaming machine includes an electronic display device, a value input device, and a plurality of electronic input devices. The plurality of electronic input devices include a first input device and a second input device. The casino wagering game performed on each gaming machine includes a first feature alternatively operable by a respective player using either the first input device or the second input device of the respective gaming machine. The method includes detecting a physical item associated with a monetary value that establishes a credit balance via the value-input device of the respective gaming machine, and initiating the casino wagering game on the respective gaming machine in response to an input indicative of a wager covered by the credit balance. The game-logic circuitry determines a level of adoption for the respective player to operate the first feature using the first input device of the respective gaming machine. In response to the first feature occurring during play of the casino wagering game on the respective gaming machine, a level of tailored instructions to the respective player (according to the respective level of adoption) is displayed via the electronic display device of the respective gaming machine. The tailored instructions are related to the operation of the first feature using the first input device of the respective gaming machine. An input is received to operate the first feature, received via at least one of the first input device or the second input device of the respective gaming machine. The level of adoption is modified by the game-logic circuitry in accordance with a manner in which the first feature is operated by the respective player. A cashout input that initiates a payout from the credit balance is received via at least one of the one or more electronic input devices of the respective gaming machine.

Additional aspects of the invention will be apparent to those of ordinary skill in the art in view of the detailed description of various embodiments, which is made with reference to the drawings, a brief description of which is provided below.

Figure 1A:
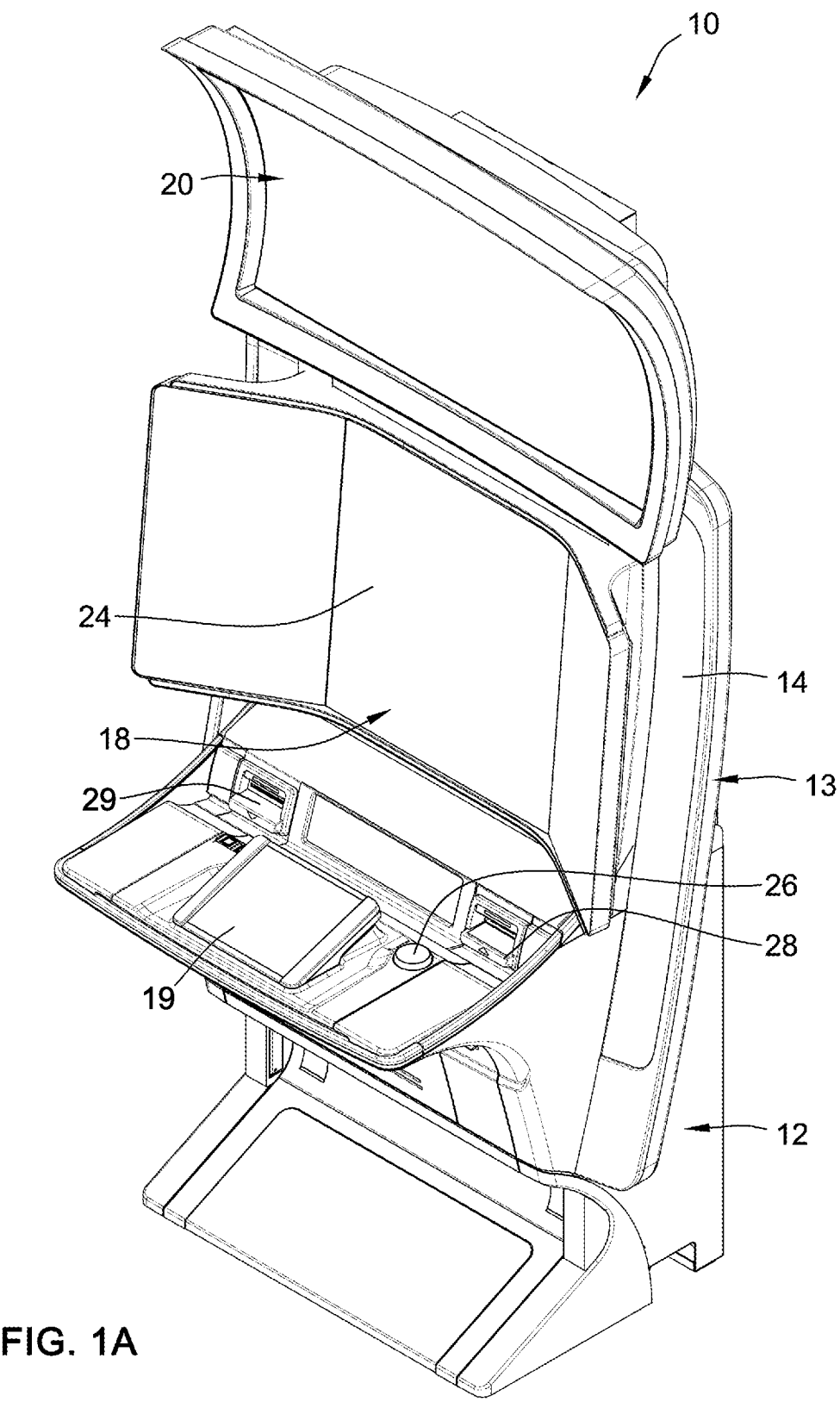
FIG. 1A is a perspective view of a free-standing gaming machine, according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1A, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 may include an electromechanical gaming terminal configured to play mechanical slots, whereas in other aspects, the gaming machine includes an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 6,554,704, 8,057,303, and 8,226,459, which are incorporated herein by reference in their entireties.

The gaming machine 10 illustrated in FIG. 1A comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 optionally forms an alcove configured to store one or more beverages or personal items of a player. A notification mechanism, such as a candle or tower light, is optionally mounted to the top of the cabinet 12. It flashes to alert an attendant that change is needed, a hand pay is requested, or there is a potential problem with the gaming machine 10. The gaming cabinet 12 optionally includes a rear wing 13 having a front surface 14 that is positioned rearward of a primary display 18.

The input devices, output devices, and input/output devices are disposed on, and securely coupled to, the cabinet 12. By way of example, the output devices include the primary display 18, a secondary display 20, and one or more audio speakers. The primary display 18 or the secondary display 20 may be a mechanical-reel display device, a video display device, or a combination thereof in which a transmissive video display is disposed in front of the mechanical-reel display to portray a video image superimposed upon the mechanical-reel display. The displays variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 includes a touch screen(s) 24 mounted over the primary or secondary displays, one or more buttons 26 on a button panel and/or other player-input devices (motion/image sensor, input controller, joystick, etc.), a bill/ticket acceptor 28, a card reader/writer and/or ticket dispenser 29, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts. For example, actuation-based input devices (i.e., input devices requiring actuating physical contact) may include a touch screen (e.g., pressing virtual buttons), joysticks, input controllers using switches or buttons, physical buttons, etc., may be used in conjunction with gesture-based input devices (i.e., input devices that detect a series of motions or player movement to recognize input types). In one example, a gaming machine 10 may alternatively use a touch screen 19, a button 26, and an additional input device to receive input to operate one or more features or aspects of the wagering game.

The gaming machine 10 includes a touch screen 19 configured to receive player input, e.g., by physical contact by fingers of the hand of a player. The touch screen 19 may also be configured to display images to aid in providing guidance to a player operating one or more features of the wagering game. Other input devices, such as a gesture-based motion detecting device (not shown) may be mounted in a position to detect player interaction (e.g., near the touch-screen 19, between the touch screen 19 and the main panel area, inside the housing 12, on a nearby wall or other surface, etc.).

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credits" meter 84 (see FIG. 3). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on the "credits" meter 84 (see FIG. 3), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 29 for printing tickets redeemable for cash or credits, a wireless communication interface for transmitting cash or credit data to a nearby mobile device, and a network interface for depositing cash or credits to a remote account via an electronic funds transfer.

Figure 1B:
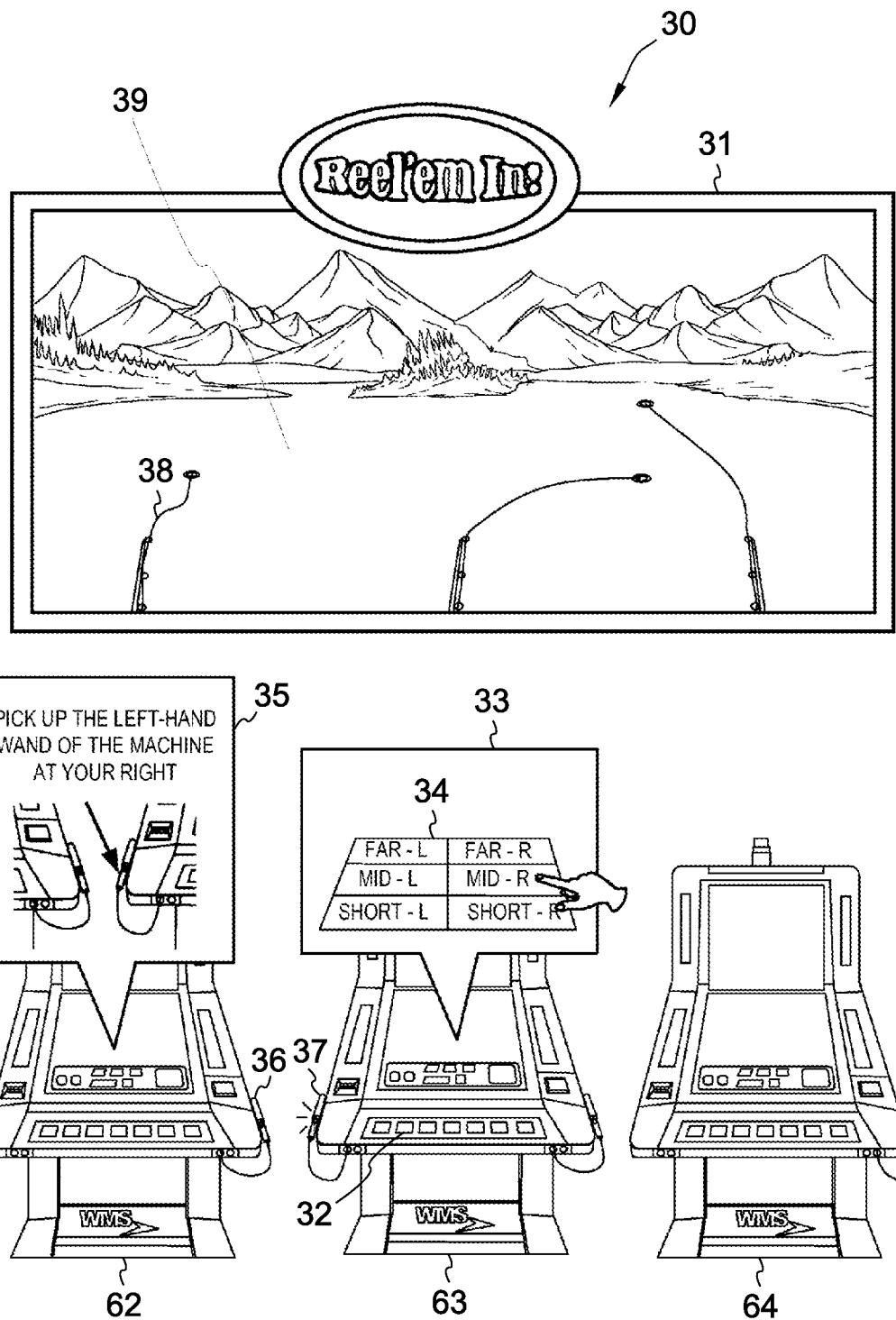
FIG. 1B is an illustration of a community based gaming system providing alternate control mechanisms for a community wagering game, according to an embodiment of the present invention.

Referring now to FIG. 1B, an illustration of a community based gaming system 30 having a plurality of wagering game machines for conducting a community wagering game is shown, according to an embodiment of the present invention. The system 30 includes wagering game machines 62-64 and a communal display 31 used to conduct the community wagering game.

In one embodiment, the wagering game machines 62-64 include multiple input devices available to use for operating features of the wagering game. For example, the wagering game machine 63 includes a bank of physical buttons 32, a display 33, a set of touch-screen controls 34, and a hand-held input device 37. The wagering game machines 62-64 utilize a combination of input devices to interact with the wagering game, for example, to specify wager amounts, initiate the wagering game, spin reels, select indicia, etc. The hand-held input device 37 may be used to operate one or more features of the wagering game by employing motion-sensing and gesture-sensing technology. As other types of input devices are developed, newer input devices may be used to enhance previous methods of wagering game interaction. The present use of motion sensing and gesture recognition provides a more ergonomic, novel, and hygienic interface for many players when compared to traditional methods of physical buttons and touchscreens operation.

In one embodiment, the buttons 32, the touch-screen controls 34, or the hand-held input device 37 may be used to control a location where a virtual fishing line 38 should be cast into a virtual lake 39 presented via the communal display 31 for the community game. For example, in the fishing game, the system provides options for casting the virtual fishing line 38 to one of six different locations in the virtual lake 39 (e.g., a short cast to left, a mid-range cast to the left, a far cast to left, a short cast to the right, a mid-range cast to the right and a far cast to the right) using the buttons 32, the controls 34, and/or the input device 37. In some embodiments, the system can show an animated tutorial that shows what happens when the user selects one of the multiple options.

Motion sensing for use with gesture recognition may be achieved using a wide variety of electronic devices that are commercially available. These devices use perceived input to discern the motion and gestures of players by interpreting player input and interaction with the input device. For example, an electronic device may detect motion using light with specific wavelengths (e.g., infrared detection using passive and/or active sensors), optics (e.g., video, imagery, and/or camera systems), radio frequency detection (e.g., radar and/or microwave detection), sound (e.g., microphones and acoustic sensors), vibration (e.g., triboelectric, seismic, and/or inertia-switch sensors), magnetism (e.g., magnetic sensors, magnetometers, touchscreen region capacitance or proximity, actual button actuation, etc.), among other methods. Devices that provide information for motion and gesture sensing may function collectively with specialized hardware and software elements to collect, refine, and process the gathered input data to determine player intentions, selections, and actions.

Among the companies that manufacture input devices that utilize motion sensing technology, Leap Motion, Inc. of San Francisco, Calif., Sixense Entertainment of Los Gatos, Calif., Microsoft Corp. of Redmond, Wash., and Nintendo Co. Ltd. of Kyoto, Japan, all provide peripheral devices (the Leap Motion Controller, Kinect, and Wii Remote/Motion-Plus, respectively) configured to detect physical motions in many dimensions and discern user gestures. Some input devices involving player hands may require physical contact (e.g., a motion-sensing, hand-held device), and other input devices may detect a player hands and allow input to be gathered without any physical contact. This latter type in input device may be considered a "hands-only-aspect" sensing device. Player motion is turned into electrical signals and provided to an electronic computing device, such as a wagering game machine, to supply input. When motion and gesture-sensing technology is employed, instructional prompts may be presented to the player in a variety of ways spanning different stimuli, for example, display of text or static imagery (flashing or subtle), graphical animations, audio presentations, controlled lighting, haptic feedback, etc. In one embodiment, a specific combination of one or more of these modular presentation elements are used.

A wagering game may recognize different types of player gestures when using a particular input device implementing motion sensing technology. For example, the wagering game machines 62-64 may be configured to recognize a set of corresponding gestures during various gaming features such as bonus games or feature events. In one embodiment, the wagering game includes distinct bonus games, each performed in response to a corresponding trigger event and operated using gesture inputs. The types of recognized gestures and the results of the detected gestures may be specific to a particular wagering game feature, changing as different gaming features are initiated. Some gestures may be common to multiple features, resulting in similar or identical results when performed.

The wagering game machine 62 may include any combination of physical buttons (e.g., buttons 32), virtual buttons (e.g., controls 34), and one or more motion-sensing devices (e.g., input device 37) for providing input for operating the wagering game features using any of the coupled input devices. The various input devices may be interchangeably used to operate features of the wagering game. For example, equivalent input for the wagering game may be achieved through use of the various input devices of the wagering game machines 62-64. For example, a physical "SPIN REELS" button, a virtual "SPIN REELS" button on a touchscreen, a button on a wired wand controller, or a recognized gesture motion of the wand may be interchangeably used to perform the "SPIN REELS" function of the wagering game. In the present case, the player may operate the feature of the wagering game (i.e., casting the virtual fishing line 38) by using a physical button 32, the touch-screen controls 34 on the display 33, or the input device 37. Ultimately, any type of input may be used to effectuate an event of a feature or wagering game, including spinning reels, making picks from an indicia field, etc.

In some instances, a first hand-held device at a first wagering game machine may be non-functional and, as a result, the system provides an option for the player to use a second hand-held device attached to a second wagering game machine adjacent to the first wagering game machine. For example, consider a case where the wagering game machine 62 has a hand-held device 36 that is not functional. The system determines that the wagering game machine 63 (situated to the immediate right of wagering game machine 62), has a left-hand hand-held device 37 that is not being used by the player at the wagering game machine 63. The system notifies the player, via a notification 35, to pick up and use the hand-held device 37. This functionality is more fully described in U.S. patent application Ser. No. 14/302,092, filed Jun. 11, 2014, to the same assignee as the current application, and is fully incorporated herein by reference.

In one embodiment, operations of the wagering game features may occur automatically, performed without player input by the wagering game. For example, the system 30 may detect an indication by a player to use the hand-held input device 36 to select a location of a virtual lake 39 into which to cast a virtual fishing line 38, but the indication also indicates that the reeling-in of the virtual line 38 should be done automatically. Therefore, the system maintains motion control for the virtual fishing rod with the hand-held device 36, but transfers control of automatic releasing and reeling-in of the virtual fishing line 38 to an auto-play feature.

Figure 2:
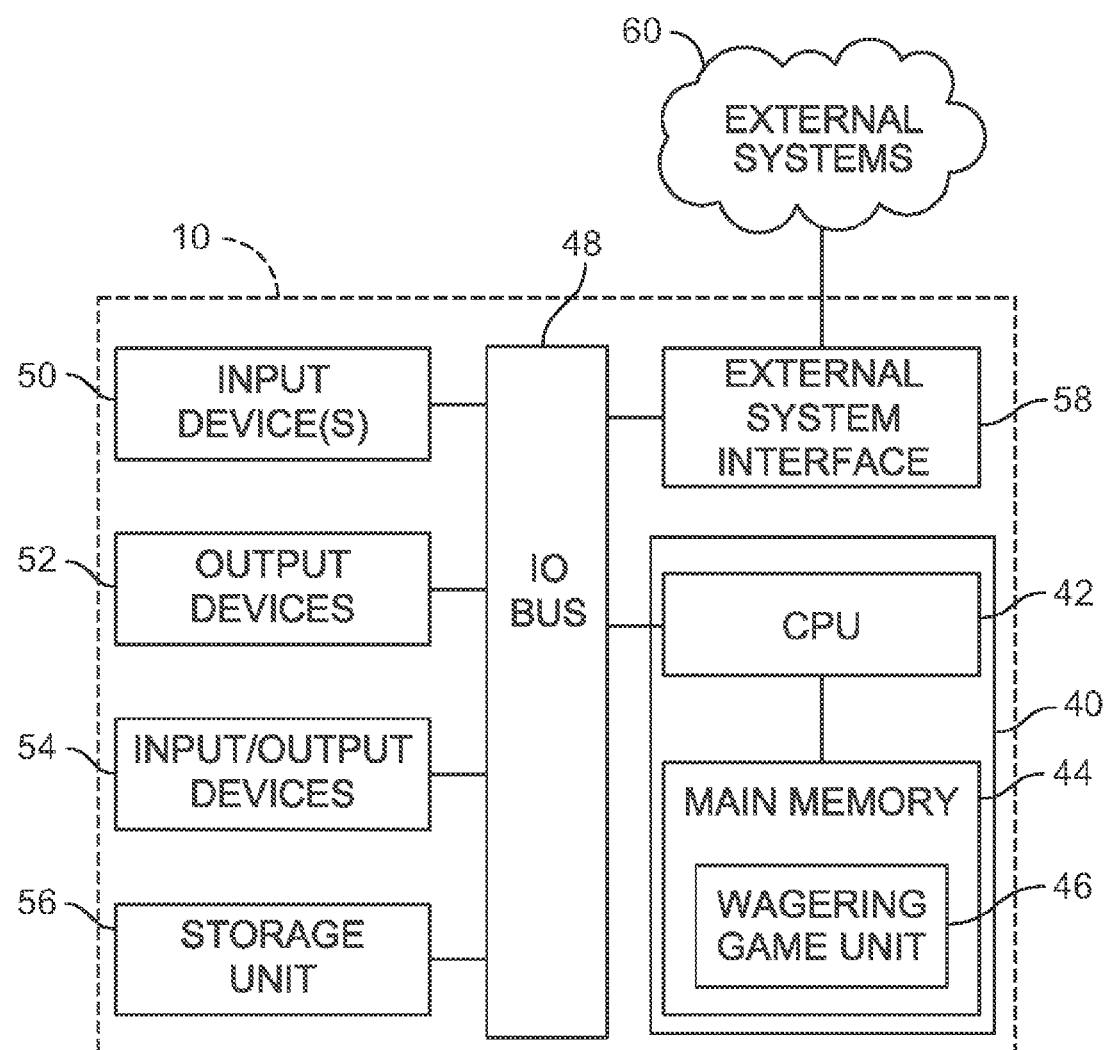
FIG. 2 is a schematic view of a gaming system according to an embodiment of the present invention.

Referring now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video black jack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player, for example, at a minimum of 100 Hz (100 calls per second) as set forth in Nevada's New Gaming Device Submission Package. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 3:
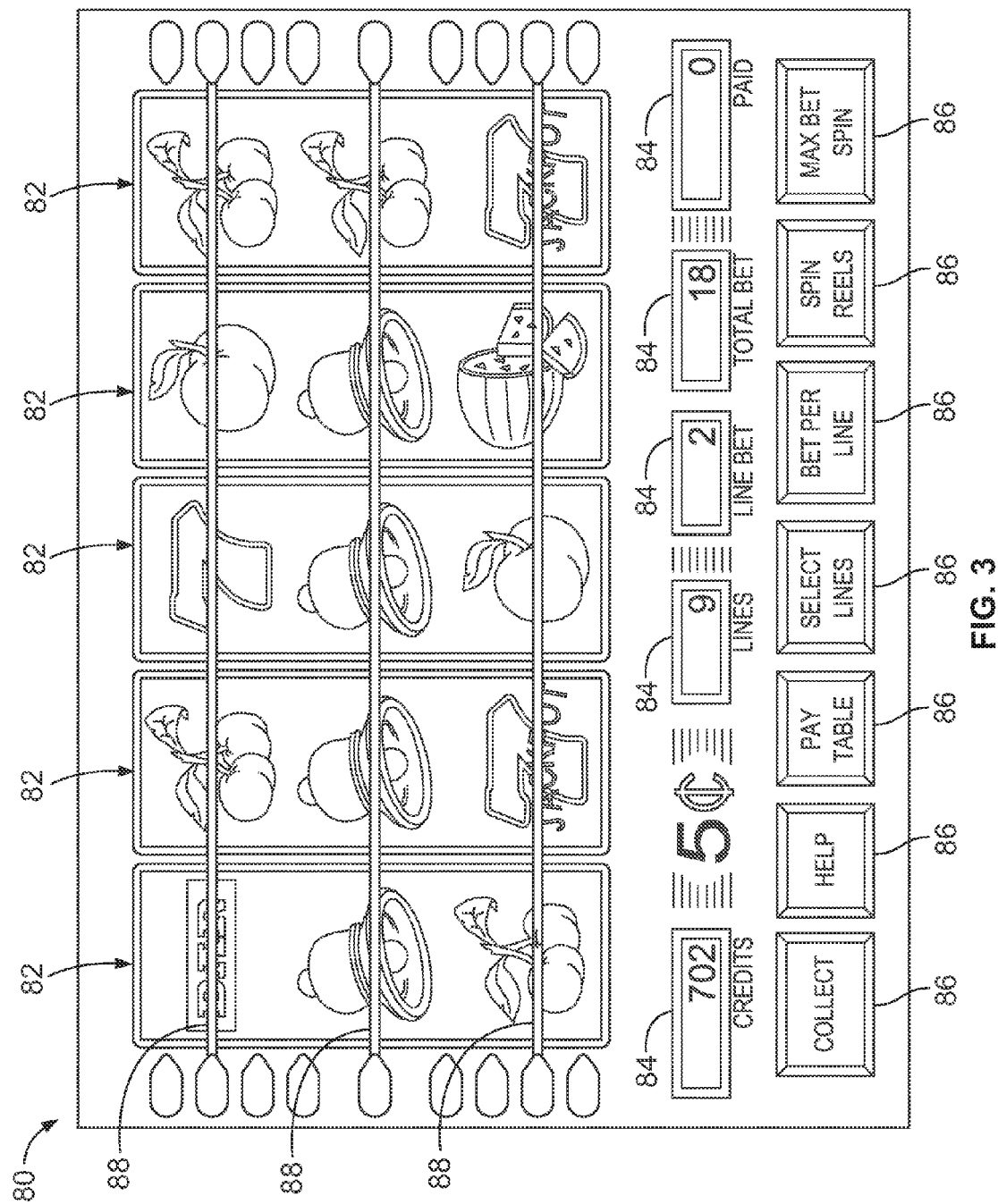
FIG. 3 is an image of an exemplary basic-game screen of a wagering game displayed on a gaming machine, according to an embodiment of the present invention.

Referring now to FIG. 3, there is illustrated an image of a basic-game screen 80 adapted to be displayed on the primary display 18 or the secondary display 20. The basic-game screen 80 portrays a plurality of simulated symbol-bearing reels 82. Alternatively or additionally, the basic-game screen 80 portrays a plurality of mechanical reels or other video or mechanical presentation consistent with the game format and theme. The basic-game screen 80 also advantageously displays one or more game-session credit meters 84 and various touch screen buttons 86 adapted to be actuated by a player. A player can operate or interact with the wagering game using these touch screen buttons or other input devices such as the buttons 26 shown in FIG. 1. The game-logic circuitry 40 operates to execute a wagering-game program causing the primary display 18 or the secondary display 20 to display the wagering game.

In response to receiving an input indicative of a wager covered by or deducted from the credit balance on the "credits" meter 84, the reels 82 are rotated and stopped to place symbols on the reels in visual association with paylines such as paylines 88. The wagering game evaluates the displayed array of symbols on the stopped reels and provides immediate awards and bonus features in accordance with a pay table. The pay table may, for example, include "line pays" and "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary display 18 or secondary display 20) through the display of information such as, but not limited to, text, graphics, static images, moving images, etc., or any combination thereof. In accord with the method of conducting the wagering game, the game-logic circuitry 40 transforms a physical player input, such as a player's pressing of a "SPIN REELS" touch key, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary display 18, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in other gaming jurisdictions. As can be seen from the description herein, the gaming machine 10 may be implemented with hardware and software architectures, circuitry, and other special features that differentiate it from general-purpose computers (e.g., desktop PCs, laptops, and tablets).

Figure 4:
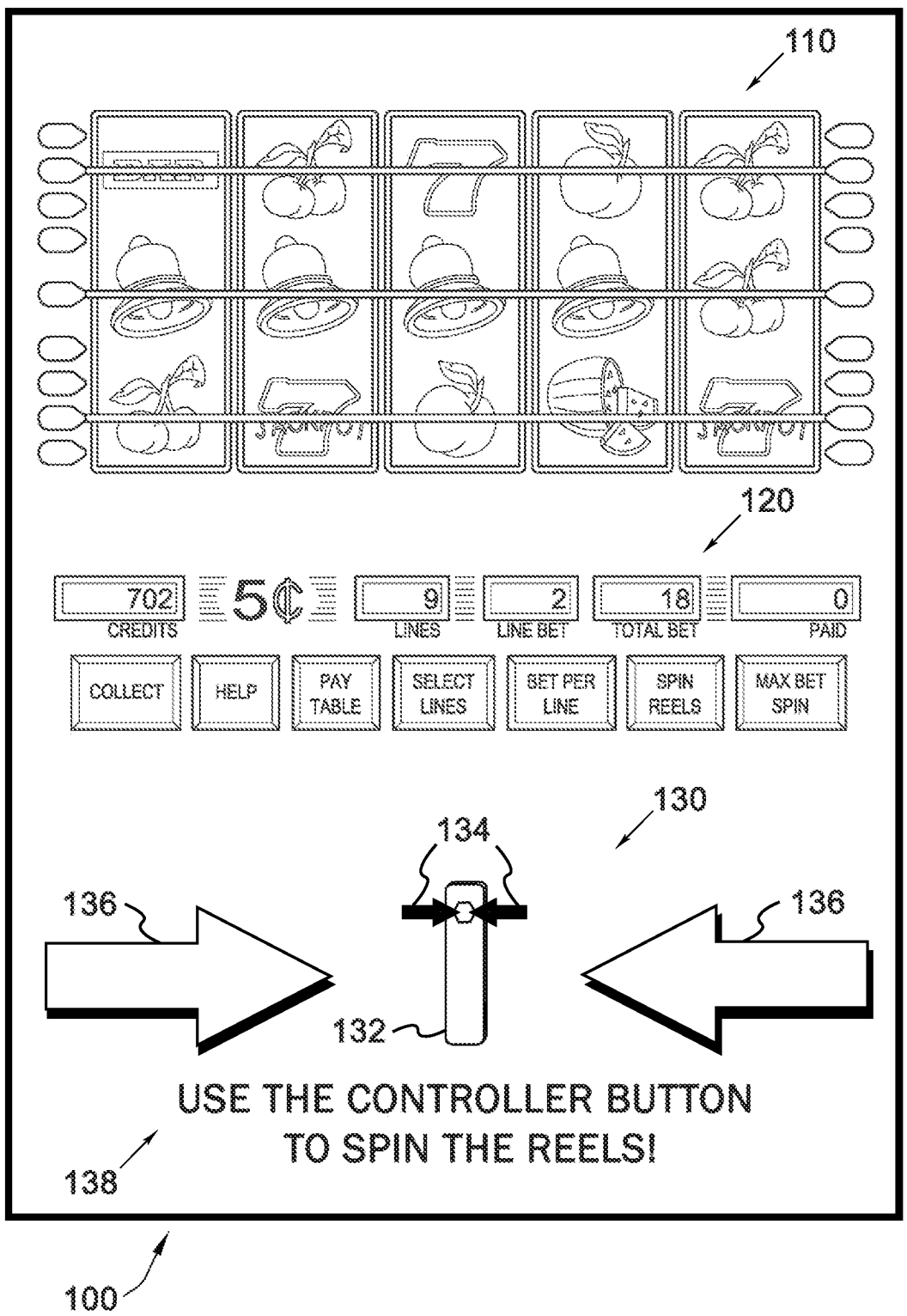
FIG. 4 is an image of an exemplary basic-game player-interface screen of a wagering game displayed on a gaming machine, according to an embodiment of the present invention.

Referring now to FIG. 4, a basic-game screen interface 100 is shown as displayed by a wagering game machine (e.g., on the primary display 18 or the secondary display 20 of machine 10) at the beginning of a gaming session in one embodiment. The interface 100 includes an outcome display section 110 and a meter display section 120, similar to the basic-game screen 80 of FIG. 3.

The interface 100 also includes a tutorial messaging interface 130 corresponding to operation of the feature of the wagering game currently in progress. The interface 130 displays intelligent messaging providing a level of tailored tutorial instruction relating to a specific input device for operating the current feature of the wagering game. The interface 130 includes a graphical image 132 of the input device controller, a set of specific input device indicators 134, a set of general input device indicators 136, and a textual banner 138. The interface elements 132-138 reflect the context of the feature(s) of the wagering game that the input device is currently providing input to operate. That is, the player interface reflects corresponding contextual tutorial messaging for the feature currently active in the wagering game and how to use the input device controller to operate the feature.

The interface 130 may include any combination of interface elements (e.g., graphical, audio, video, etc.), including those described above. Different combinations of the elements of the interface 130 are combined to present a level of tailored instructions to the player according to a determined level of adoption for the player regarding the input device (e.g., input device 36) for operating the current feature of the wagering game. For example, in one embodiment, the interface 130 displays all the interface elements 132-138 at the start of each gaming session. The display of the elements 132-138 in the interface 130 is based on an initial default level of adoption for the input device and specifically relates to initiating a wager by spinning the reels. The level of adoption indicates that the player has a default amount of proficiency, familiarity, and desirability of usage of the input device at the start of each gaming session. Thus, at this (currently default) level of adoption, the player is presented with all of the interface elements 132-138, providing tutorial messaging to familiarize the player with the input device and the usage of the input device for operating the current feature in the wagering game.

In one embodiment, the level of adoption is determined separately for each particular input device for each gaming feature of the wagering game. In response, a level of tailored instructions is presented to the player (via the player interface) corresponding to the level of adoption for the input device during the specific feature. For example, the first time a particular gaming feature is performed, a detailed tutorial may occur instructing the player how to use the input device to operate the gaming feature and initiate different gaming actions. As the wagering game continues and contextual feature actions are operated and performed using the input device, the level of tailored instructions changes by omitting specific tutorial information that is considered unnecessary or redundant. The tutorial information that is omitted may relate to previously player-performed gestures. In one embodiment, as the level of adoption increases (in response to the player using the input device to perform gaming feature functions), the level of tailored instructions (in the form of tutorial messaging) decreases accordingly. Further, the level of tailored instruction may change after a predetermined number of tutorial messages are presented, regardless of whether a gesture of the input device is performed.

The level of tailored tutorial messaging for a particular input device (and feature gestures) based upon a level of adoption addresses a number of issues with player interaction with modern gaming machines. Interface instructions (e.g., tutorials or prompts) may become irritating to players during gameplay. That is, the presentation of unwanted, unnecessary, or redundant information may annoy or repel active players, reducing machine usage and resulting revenue. Likewise, players with lesser proficiency or familiarity of particular input methods may find tutorial instruction beneficial, and other players may simply not want to use a particular type of input method or input device at all. As the level of proficiency of a player using a particular input method evolves during a gaming session, the level of required or desired tutorial should also evolve.

Thus, the level of adoption for a particular input device is modified in accordance with a manner in which the player interacts with the wagering game and the wagering game features. For example, in response to a player operating a feature using a particular input device, the level of adoption may change. Alternatively, in response to a player operating a feature not using a particular input device, the level of adoption may change. Further, the level of adoption may remain static (i.e., not be modified) until one or more criteria are met. For example, the level of adoption for an input device may remain unchanged during the first four presentations of a particular series of instructional messaging, and then change to alter the level of tailored messaging the player receives regarding the input device when a fifth presentation occurs.

The manner in which a player operates the feature may affect the level of adoption for one or more input devices simultaneously, independently, or not at all, and subsequently alter the level of tailored messaging the player receives in regard to one or more input devices. Changes in the level of adoption may occur all-at-once, or gradually change over time as the manner of operation of the feature(s) of the wagering game occur. A set of criteria may be used to selectively control how input device interaction and feature operation impact the level of adoption and how the levels of tailored messaging correspond to the level of adoption. A similar or identical level of tailored messaging may result by levels of adoption associated with different input devices changing during feature operations.

In short, the way a player uses (or does not use) all available input devices for interacting with a feature of a wagering game defines a manner of operation for the feature. In response, the wagering game modifies a corresponding level of adoption in accordance with the manner in which the player operates the feature. The level of adoption is then used to conduct a tailored level of messaging in response to the level of adoption. In one embodiment, the tailored level of messaging is drawn to intelligently selected and presented instructional messaging to promote the usage of a particular input device during a wagering game and features of the wagering game. Each gaming feature may be treated independently, or multiple features may have levels of tailored messaging linked together or identically defined.

The level of adoption may be assigned a descriptive label for the different values, for example, "no proficiency", "default proficiency", "some proficiency", "medium proficiency", "high proficiency", etc. Using these labels, the creation of adaptive rules controlling the display of specific tutorial messages becomes simpler. As the level of adoption changes as a result of player interaction (or non-interaction), messaging may be tailored to promote usage of the input device to operate the wagering game features. Further, the level of adoption may automatically change over time in response to the amount, frequency, or type of input received from the input device. In this way, a player may be reminded to use the input device to operate a feature the player has performed in the past. One or more messages may be displayed a predetermined number of times before the messages are no longer displayed to help promote usage of the input device without becoming redundant or irritating.

The levels of tailored instruction and tutorial messaging may include any number of stimuli, including but not limited to display of text or static imagery (obvious or subtle), graphical and/or video animation, audio presentations, controlled lighting, haptic feedback, etc., and any combination thereof. Thus, each of the interfaces 110, 120, 130 (and additional interfaces, not shown) may include stimuli and messaging corresponding to the level of adoption of one or more input devices for operating features of the wagering game.

In one embodiment, a method for intelligently and dynamically controlling an amount of tutorial instruction is provided enhancing the player experience by minimizing unneeded or undesirable messaging. The method involves selective control of tutorial messaging based upon changing attributes associated with a player during a session (i.e., the measure of proficiency and/or desirability for input methods for operating features of a wagering game). Thus, tutorial information and messages are presented in context, when needed, and omitted when redundant. In this way, tutorial messaging may occur relating directly to operating a current gaming feature of a wagering game to display appropriate input gestures and useful information without becoming irritating.

In one embodiment, a gaming session begins when a physical item associated with a monetary value is detected that establishes a credit balance on a credit meter (e.g., part of interface 120). Player interaction with the wagering game machine, the current (contextual) wagering game features, and the available input devices, are combined to provide a basis for determining the types and levels of tailored instructions for the player during the wagering game session. A gaming session is considered to end when the credit meter is reduced to zero credits. The credit meter may reach zero credits as a result of receiving a cashout input initiating a payout from the credit balance, or when all available credits in the credit meter are wagered and lost.

In one embodiment, a level of adoption for an input device for operating a feature resets at the beginning of each gaming session. The level of adoption changes in response to interaction of the player with the input device during the features of the session. That is, as interaction with the input device occurs (or fails to occur) during a gaming session, a level of tailored instructions is presented to the player in accordance with the changing level of adoption.

In another embodiment, the player has a persistent account that maintains the level of adoption for various input devices, wagering games, wagering game features, etc. spanning a plurality of gaming sessions. The player account may be digitally stored locally on the wagering game machine or be stored, accessed, and/or copied to/from one or more external systems (e.g., systems 60) via a network or other communicative link. The player account may include other additional information, for example, a history of games played, a history of credits won, feats obtained, etc.

A level of adoption maintained in a gaming session for a particular input device may be high during a familiar feature and simultaneously low during features not yet performed, even though the input device and gestures may be common to both features. In this case, the level of tutorial instruction for the player decreases during the familiar feature and increases during the new features, in accordance with the level of adoption determined for each of the gaming features.

In one embodiment, the level of tailored instructions to the player is inversely proportional to the level of adoption. That is, as the level of adoption increases, the level of tutorial instruction decreases, thereby removing the interface elements 132-138 from the interface 100 in a predetermined order in accordance with the level of adoption. For example, at the lowest level of adoption, all of the interface elements 132-138 are displayed. As the level of adoption increases, the textual banner 138 is removed. As the level of adoption continues to increase, the set of general indicators 136, the set of specific indicators 134, and the graphical image 132 of the input device are removed from the interface 100.

The availability of use for a particular input device may not be altered by the changing of the level of adoption and the level of tailored instruction messaging. That is, even if the level of tailored instruction does not display information regarding the availability of one or more input devices, the input devices may be still available for operating the current feature of the wagering game. For example, if the interface 130 is totally suppressed (not at all displayed) as a result of the player's lack of usage of an input device (effecting a given level of adoption), the ability to use the input device to operate the feature is not limited.

In one embodiment, the image 132 of the input device is shown during all periods where the input device is available to provide input to operate the current gaming feature. In accordance with the level of adoption, one or more indicators 134 may be displayed to specify the buttons of the input device, while one or more indicators 136 and banners 138 are displayed to indicate a feature of the wagering game is currently active.

In a simplified example, the level of adoption may have only two distinct values indicating the input device has or has not been used to operate the current feature. When the level of adoption indicates the input device has not been used to operate the current feature, the interface 100 displays all of the interface elements 132-138, and when the level of adoption indicates the input device has been used to operate the current feature, none of the interface elements 132-138 are displayed. In other examples, a combination of the displayed interface elements 132-138 may be modified to fit various levels of adoption defined for each input device and gaming feature. For example, at a given level of adoption the indicators 136 and the textual banner 138 may be displayed together as a single element or be separately controlled. The resulting levels of tailored instructions correspond to the combination of interface elements 132-138 that are presented to the player during each feature of the wagering game session.

In one embodiment, in response to a first use of the input device to operate the feature (e.g., to spin the reels), the level of adoption may be suitably altered, resulting in the omission of the set of general indicators 136 in all future presentations of the interface 130 of the session. In response to an additional use of the button of the controller, the level of adoption may again change, resulting in other modification of the interface 130, for example, omission of the specific controller indicators 134 and the textual banner 138.

The level of adoption may be altered by other gaming events to change the presentation of the interface 130. For example, a player may make a selection from a menu of the interface 100 to reset one or more levels of adoption to reintroduce the interface elements 132-138, during future display of the interface 130. Alternatively, a repeated display of the interface elements 132-138 (e.g., a predetermined number of times) may alter the level of adoption to reduce redundant display of messaging in the interface 130.

The level of adoption may be used to intelligently respond to various types of player interaction, for example, removing or scaling back tutorial messaging based upon a player using or not using a particular input device or gesture, the number of times a message is displayed to a player, the number of times presented/offered to a player, the amount of time presented/offered, the amount of time into gameplay or feature duration, the selection of a different input device to provide input, no direct refusal of input device usage, the occurrence or failure of an active choice of input device made by the player, etc.

The changing level of adoption may cause the resulting tailored level of messaging to reinstate or repeatedly offer tutorials or presentations. Players are encouraged to select from many input devices or gestures to enhance comfort and interaction. Resulting tutorials may persist for features or gestures until criteria for exclusion is fulfilled. Each gesture, input device, and gaming feature is separately configurable by the designer, and tutorial messaging may be limited to specific durations, periods of time, times of day, specific features, or enhanced or restricted based upon a level or adoption or proficiency is established. Likewise, if an input device is used and later neglected, a reason for the non-usage may be presumed to exist, causing a shift in level of adoption and/or level of messaging to offer or suppress tutorial messages for alternate input methods. Once a player is "opted-in" to a specific gesture or input device method or usage, messaging may continue on a contextualized basis, for a limited number of times. For example, after three offers to use a given input device, presentation of the offer terminates. Tutorial messaging offers for some features, gestures, or input devices may remain, persist, or be removed based on the changing level of adoption caused by player interaction. Further, when multiple gestures or ways to provide input are available, prompting or selections may persist until criteria is met that stops or restarts the prompting. Additionally, different sets of rules (algorithms) may be employed for each particular gesture, during different periods of the wagering game, during different wagering game features, and/or in response to specific player input.

In one embodiment, during a feature when a specific gesture is available for use, a tutorial message is displayed reporting to the player that input device is active and the player can begin performing the gesture. If the gesture is not detected within a set amount of time (or input is detected using another input device, e.g., a touchscreen), the tutorial message is removed and not shown again until the gesture again becomes available in a future feature. If the player does not use the input device to perform the gesture again, the tutorial messages are turned off for the remainder of the player's gaming session.

The level of adoption and resulting level of tailored instruction may also recognize a difference between engaging the device and using the device to perform an action (e.g., operate a feature) due to the provision for multiple input devices and methods and devices. For example, when initial tutorial messaging is shown for an input device, a fuller set of instructions may be presented as opposed to repeated future messaging. As usage of the specific input device diminishes, it is possible to lapse back into a full set of instructions as a result of repeated non-usage. Modular tutorial messages may be used, such that all messages are initially presented and decrease as familiarity with the input device increases. For example, after a first interaction, one or more modular messages are removed and remain hidden in presumption that the user knows the input device exists, perhaps having used it for a prior operation. Tiered sets of rules may also be defined for different levels of familiarity for each particular feature or context.

Also, various levels of tailored instruction may be defined, for example, a "shorthand tutorial", "longhand tutorial", and "no tutorial." As successful interactions with the input device(s) occur, visual "shorthand" messages may be shown as an evolving level of tutorial. The changes in messaging may also involve various degrees of addition or removal of text, visual animation, audio, haptic, lighting, etc.

Figure 5:
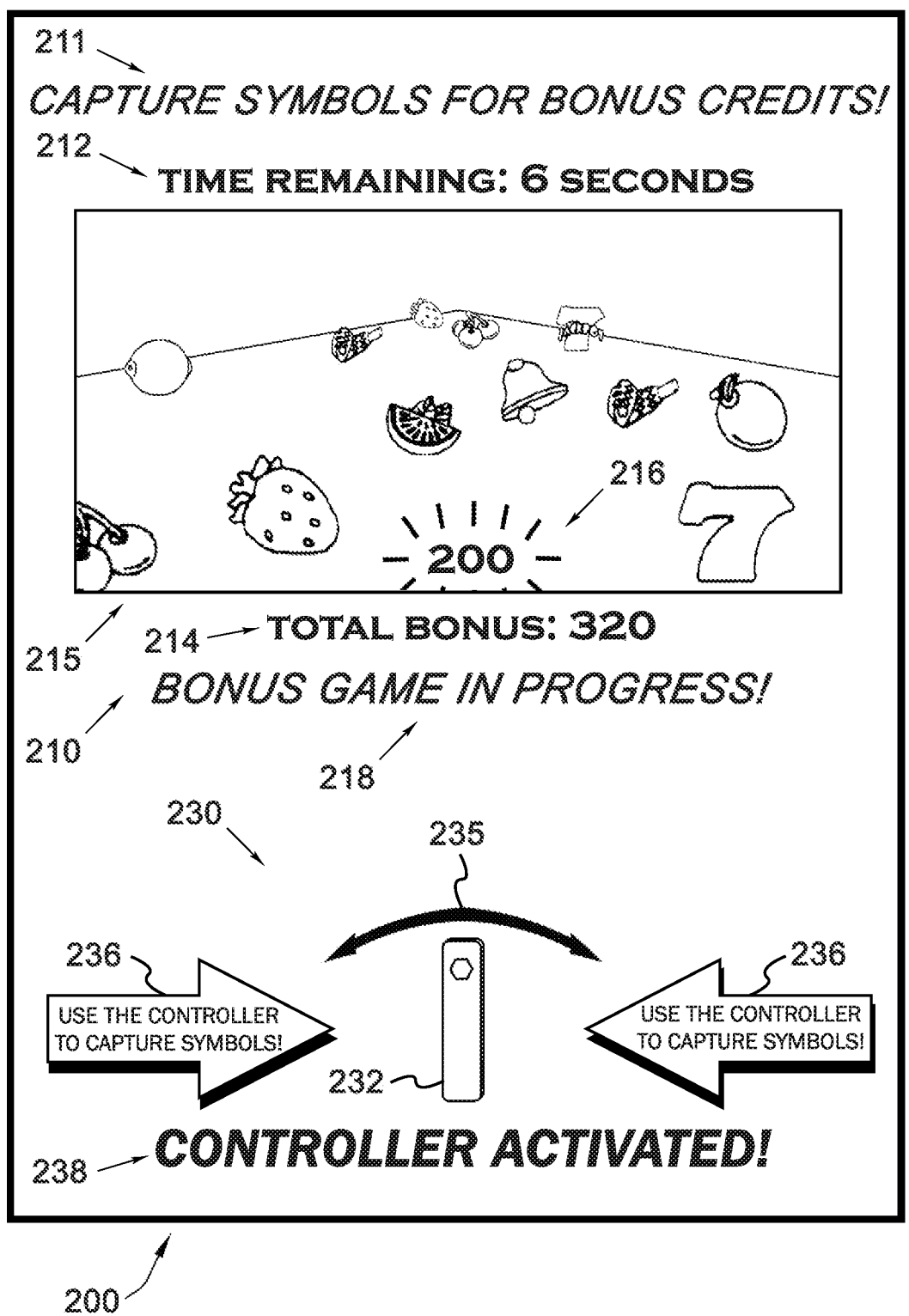
FIG. 5 is an image of an exemplary bonus-game player-interface screen of a wagering game displayed on a gaming machine, according to an embodiment of the present invention.

Referring now to FIG. 5, a bonus-game screen interface 200 of a wagering game feature is displayed (e.g., on the primary display 18 or the secondary display 20 of gaming machine 10) in response to a feature trigger during the base wagering game in one embodiment. For example, the bonus-game feature displayed in interface 200 may be a result of a determined bonus-game trigger displayed in the outcome display section 110. The interface 200 includes a bonus-game feature interface 210 and a tutorial messaging interface 230.

The interface 210 shows a bonus-game feature allowing the player to experience forward motion while capturing fruit symbols for bonus credits. The interface 210 includes a header banner 211, a duration meter 212, a bonus meter 214, a gaming playfield 215, a bonus alert banner 216, and an alert banner 218. The header banner 211 provides textual information to the player regarding the immediate operation of the current feature of the wagering game. The duration meter 212 provides a timer counter informing the player of the remaining time of the current feature of the wagering game. The bonus meter 214 provides a counter reflecting the amount of gathered credits during the current feature of the wagering game. The gaming playfield 315 displays a visual portion of the game play of the feature. The alert banner 218 provides additional textual information regarding the current feature of the wagering game.

The interface 200 also includes a tutorial messaging interface 230 corresponding to the current feature of the wagering game. The interface 230 displays a level of tailored tutorial instruction relating to a specific input device during the current feature of the wagering game. The interface 230 has a set of interface elements including a graphical image 232 of the input device, a motion tutorial input device indicator 235, a set of general input device indicators 236, and a textual banner 238.

The level of adoption determined and maintained for the input device of the current feature of the wagering game is distinct from the level of adoption for the input device of the base-game feature of the wagering game. In one embodiment, as the current feature of the wagering game is being performed for the first time, the level of instruction displayed by the interface 230 includes all of the available interface elements 232-238. As the level of adoption of the input device changes for the current feature of the wagering game (e.g., in response to an amount of player interaction with the input device), the interface 230 will tailor the level of instruction messaging (e.g., by omitting display of various interface elements) in accordance with the level of adoption.

Multiple options for player input may be available to the player. For example, one or more physical or virtual buttons may be available to allow the player to operate the current feature of the wagering game in addition to an input device displayed in the interface 230. In one embodiment, the interface 210 and/or interface 230 may display additional tailored instruction messaging regarding these available options in accordance with the level of adoption. Each input device may have an associated level of adoption associated therewith for the current feature of the wagering game, and tailored instructional messaging may be included in accordance with the corresponding levels of adoption for the current feature of the wagering game. The tailored instruction and messaging may include display of text or static imagery, animation, audio, lighting, haptic/tactile feedback, etc., and combinations thereof.

In one embodiment, the indicator 235 represents an input device gesture available to the player for motion control in the interface 210 to operate the current feature of the wagering game. In one embodiment, as the player uses the input device to perform this movement, the indicator 235 is immediately removed from display. In one embodiment, the indicators 236 and 238 are also removed from display on the interface 230. These interface elements may be displayed again in future performances of the current feature, but only at the beginning of these future features. Further, in the event that a player does not engage the input device to interact with the current feature, a tally may be kept to determine the number of times each of the interface elements have been displayed in the interface 230 to the player. After a predetermined number of display presentations, the interface element(s) are no longer displayed as part of the interface 230. Thus, a correspondence between the tailored level of instructional messaging and the level of adoption of the input device in the current feature may be selectively controlled.

Figure 6:
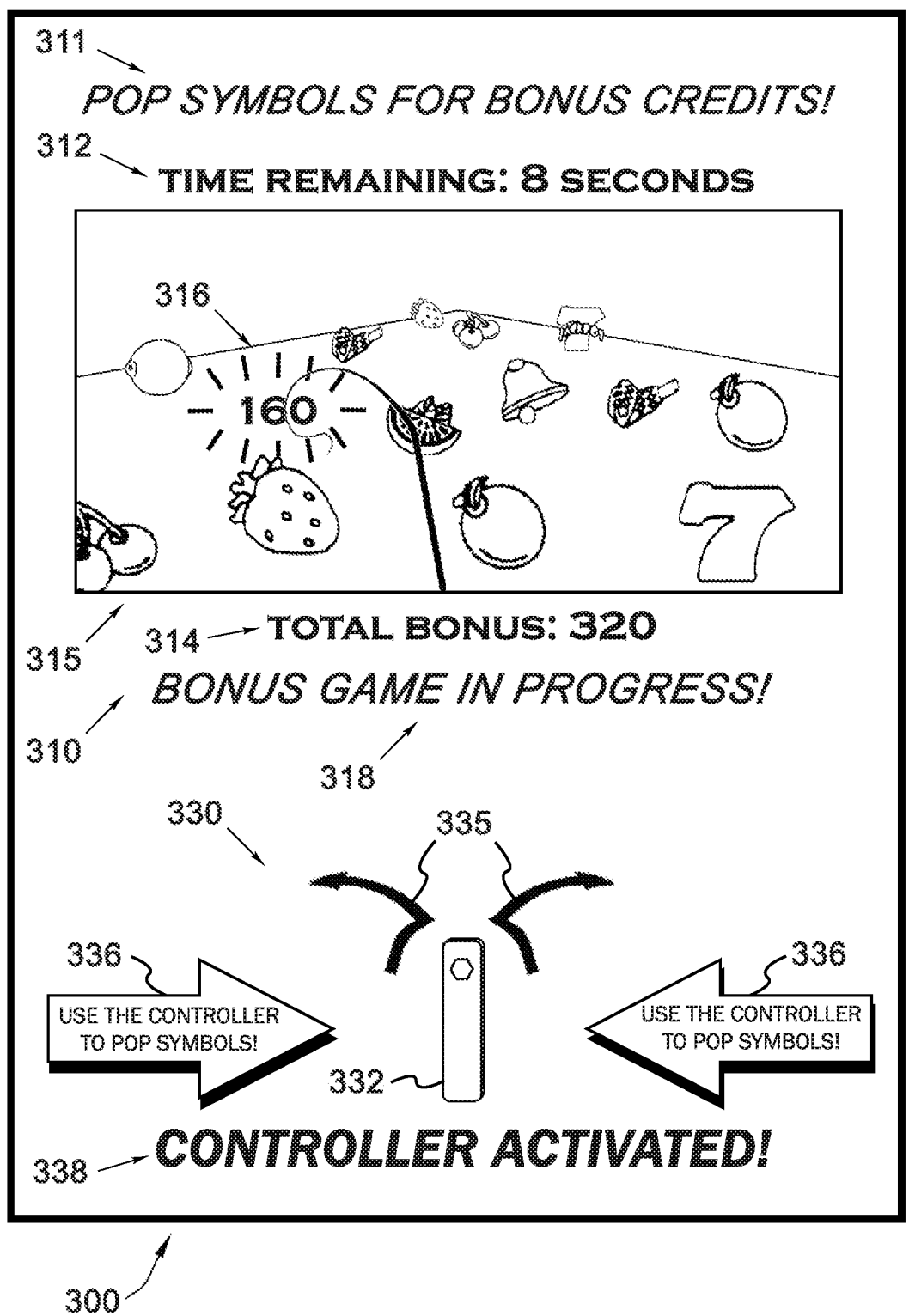
FIG. 6 is an image of an exemplary bonus-game player-interface screen of a wagering game displayed on a gaming machine, according to an embodiment of the present invention.

Referring now to FIG. 6, a bonus-game screen interface 300 of a wagering game feature is displayed in one embodiment. For example, the bonus-game feature displayed in interface 310 may be a result of a determined bonus-game trigger displayed in the outcome display section 110. In one embodiment, the bonus-game feature displayed in interface 210 and the bonus-game feature displayed in interface 310 are features that are part of the same wagering game, separately triggered and performed by the player using the same hardware and software gaming machine configuration.

The interface 300 includes a bonus-game feature interface 310 and a tutorial messaging interface 330. The interface 310 shows a bonus-game feature allowing the player to use the input device to simulate a whip and pop fruit symbols for bonus credits. The interface 310 includes a header banner 311, a duration meter 312, a bonus meter 314, a gaming playfield 315, a bonus alert banner 316, and an alert banner 318. The header banner 311 provides textual information to the player regarding the immediate operation of the current feature of the wagering game. The duration meter 312 provides a timer counter informing the player of the remaining time of the current feature of the wagering game. The bonus meter 314 provides a counter reflecting the amount of gathered credits during the current feature of the wagering game. The gaming playfield 315 displays a visual portion of the game play of the feature. The alert banner 318 provides additional textual information regarding the current feature of the wagering game.

The interface 300 includes a tutorial messaging interface 330 corresponding to the current feature of the wagering game. The interface 330 displays a level of tailored tutorial instruction relating to a specific input device during the current feature of the wagering game, based on a separate level of adoption maintained for the feature of the wagering game shown in FIG. 5. The interface 330 has a set of interface elements including a graphical image 332 of the input device, a set of motion tutorial input device indicators 335, a set of general input device indicators 336, and a textual banner 338. Due to the comparative complexity of the motion of the input device as compared to the feature displayed in FIG. 5, an additional (or alternative) indicator 335 may be presented, including video or animation to show the motion of the input device so that the player may emulate the motion to perform the recognized gesture. As previously noted, a variety of varying stimuli may be used to provide instruction and tutorial messaging including audio, video, lighting, etc., and combinations thereof.

The level of adoption determined and maintained for the input device and gestures of the current feature is distinct from the level of adoption previously determined and stored relating to the base-game feature (FIG. 4) and the prior bonus-game feature (FIG. 5). In one embodiment, as the current feature of the wagering game is performed for the first time, the level of instruction displayed by the interface 330 includes all of the available interface elements 332-338, even if one or more of these gestures, messages, or representations were determined to be unnecessary in the prior feature displayed in FIG. 5. In one embodiment, the level of adoption for the current feature will change independently from the level of adoption for all other features, for example, based upon an amount of player interaction with the input device during this feature. Accordingly, the interface 330 will tailor the level of instruction and tutorial messaging in accordance with the level of adoption for this feature.

Again, selective interface elements may be displayed or hidden based upon prior determinations of a level of adoption during one or more features of the wagering game. Additionally, a tally of presentation of the interface elements 332-338 may be maintained and used to selectively control display of elements of the interface 330.

Figure 7:
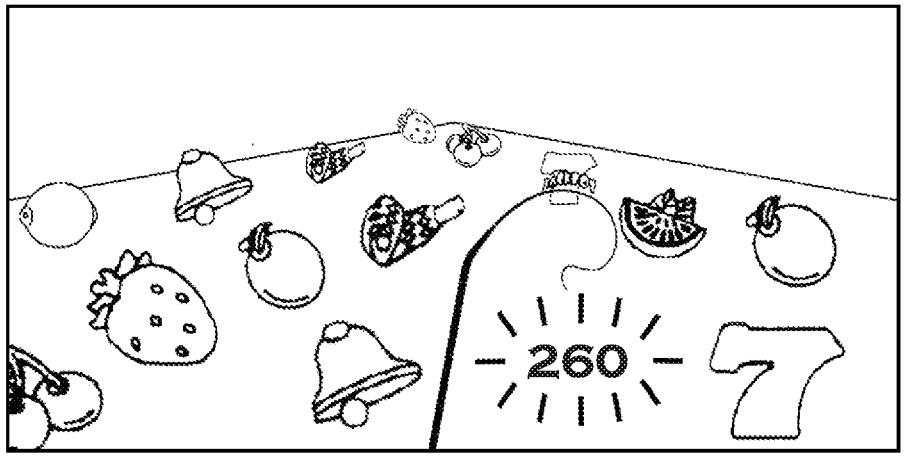
FIG. 7 is an image of an exemplary bonus-game player-interface screen of a wagering game displayed on a gaming machine, according to an embodiment of the present invention.
Figure 7:
Figure 7:
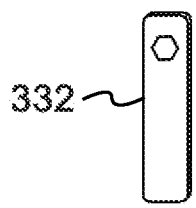

Referring now to FIG. 7, the bonus-game screen interface 300 of the wagering game feature is displayed in one embodiment. The bonus-game screen interface 300 of the wagering game feature shows the effect of a different level of adoption as compared to FIG. 6.

The bonus-game screen interface 300 displays a tailored level of instruction and messaging in accordance with the newly determined level of adoption. The bonus-game screen interface 300 includes a bonus-game feature interface 310 and a tutorial messaging interface 330. The bonus-game feature interface 310 shows the gameplay of the bonus-game feature. The tutorial messaging interface 330 is displayed in accordance with the new (current) level of adoption. The tutorial messaging interface 330 displays a tailored level of minimized instruction consisting of only the graphical image 332 of the input device indicating to the player that the device is active and accepting input. An additional bonus-game symbol interface 340 is displayed, also in accordance with the level of adoption, displaying the symbols that the player has successfully popped and received credits for. In one embodiment, the interface 340 is only provided in a feature when a minimum level of adoption is obtained.

Figure 8:
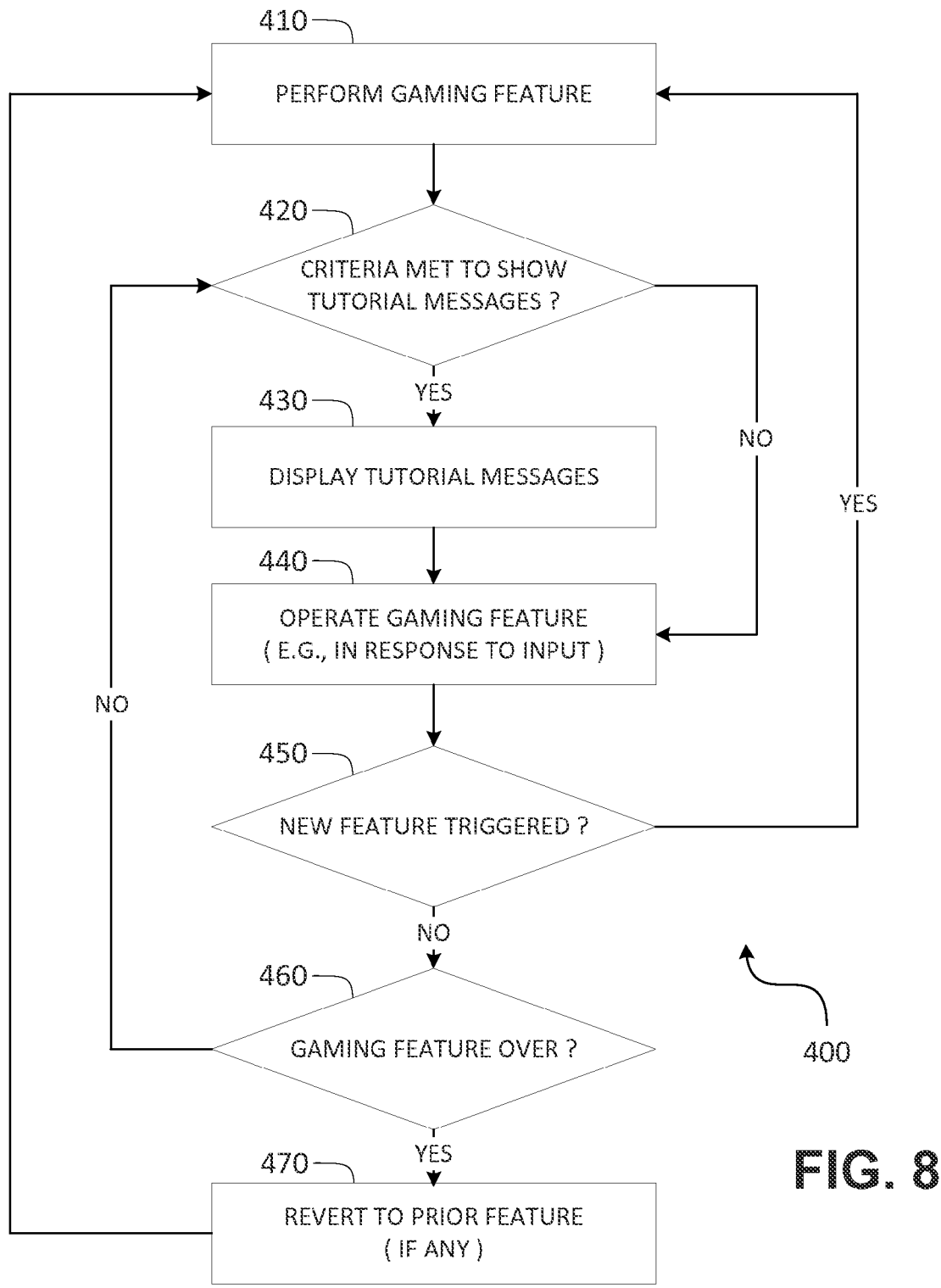
FIG. 8 is a flowchart of a computer-enabled data-processing method for controlling the selective display of intelligent messaging during the operation of a wagering game, according to an embodiment of the present invention, corresponding to instructions executed by a controller in accord with at least some aspects of the disclosed concepts.

Referring now to FIG. 8, a computer-enabled data processing method 400 is shown for selectively displaying tutorial messaging during the operation of a wagering game. The process 400 intelligently controls the perceptual output for a level of tailored instructions to the player during a gaming feature according to a level of adoption maintained for the feature during the gaming session. The level of adoption relates to an amount of usage, familiarity, proficiency, desirability, etc. of the input device for the particular context of the gaming feature of the wagering game, as detailed prior.

In step 410, the gaming feature is initiated and performed by the wagering game machine. The gaming feature may be a base-game, bonus-game, or other contextual presentation feature of the wagering game.

In step 420, a determination is made whether to present tutorial instructional message(s) to the player using a set of criteria. In one embodiment, tutorial messaging occurs during the performed gaming feature in accordance with the current level of adoption for the one or more input devices available for operation of the feature. Examples of criterion that may be used to determine the display of the tailored level of instructions to the player include the level of adoption for the session (relating to the feature, input device, and available actions), a prior display count for each tutorial message, a duration of display, an express indication by the player to present or suppress the tutorial messaging, a detected engagement with the input device, etc.

For example, criteria for tutorial messaging may include display of tutorial messaging relating to a particular operation of the gaming feature for a specific number of times before the system no longer displays the tutorial messaging until expressly instructed to reset or reintroduce tutorial messages. Further, the usage of an input device to operate the feature may indicate tutorial messaging regarding that particular operation to be subsequently unnecessary, causing any tutorial messaging to stop completely.

In step 430, when criteria for displaying tutorial messages is met, the tutorial messages are presented to the player. A level of tailored instruction is constructed particular to the decision(s) made in step 420, resulting in a dynamically determined set of tutorial messaging. The tutorial messaging may include display of text or static imagery, animation, audio, lighting, haptic/tactile feedback, etc., and any combinations of these.

In step 440, after (and/or during) the tutorial messaging is presented, operation of the gaming feature takes place. This may be a result of a selection made by the player using one of the input devices available for the feature. For example, a physical button may be used to make a selection, an alternate input device (e.g., a wand or motion-sensing hand detector) may be used to select from a field of indicia, etc. Alternatively, the selection may occur automatically (performed by the game-logic circuitry), perhaps after a predetermined period of time in absence of other input by the player. The gaming feature may include a wide variety of functional occurrences, including base-game instances, bonus-game instances, presentation segments, etc.

The input received (or not) by the player to operate the feature may modify the respective level of adoption for the feature in accordance with the type of interaction. For example, the engagement and usage (or failure) to operate the feature using a specific input device by the player may result in a modified level of adoption for the input device, impacting future messaging. In one embodiment, a player operating the feature using a motion-sensing input device may see reduced tutorial messaging in the future, a reminder tutorial message if a player does not use the input device in a subsequent attempt, and all tutorial messaging may be terminated after a predetermined number of offers or presentations regardless of whether the input device is employed to operate the feature.

In step 450, a determination is made as to whether a new feature (or new context) is triggered. In one embodiment, a wagering game has two features that always follow one another, and so, after the first feature is operated, a subsequent second feature is triggered to occur having a new context, and using a new level of adoption for each input device relating directly to the second feature. If a new feature is triggered, flow control returns to step 410 where the new gaming feature is performed. In other embodiments, trigger events of outcomes in the first feature may trigger a second feature to initiate.

In step 460, when no new feature is triggered, a determination is made as to whether the gaming feature should terminate (i.e., the feature is concluding). If not, flow control returns to step 420 to continue to make determinations for the selective and intelligent presentation of tutorial messaging for the ongoing feature.

In step 470, if it is determined that the gaming feature should conclude, the current gaming feature reverts back to the most prior gaming feature context available, and if none exists, a default or base-game feature is engaged as the current feature. The process returns flow control to step 410 to perform the corresponding feature and present tutorial messaging in accordance with the established criteria for the current context.

Figure 9:
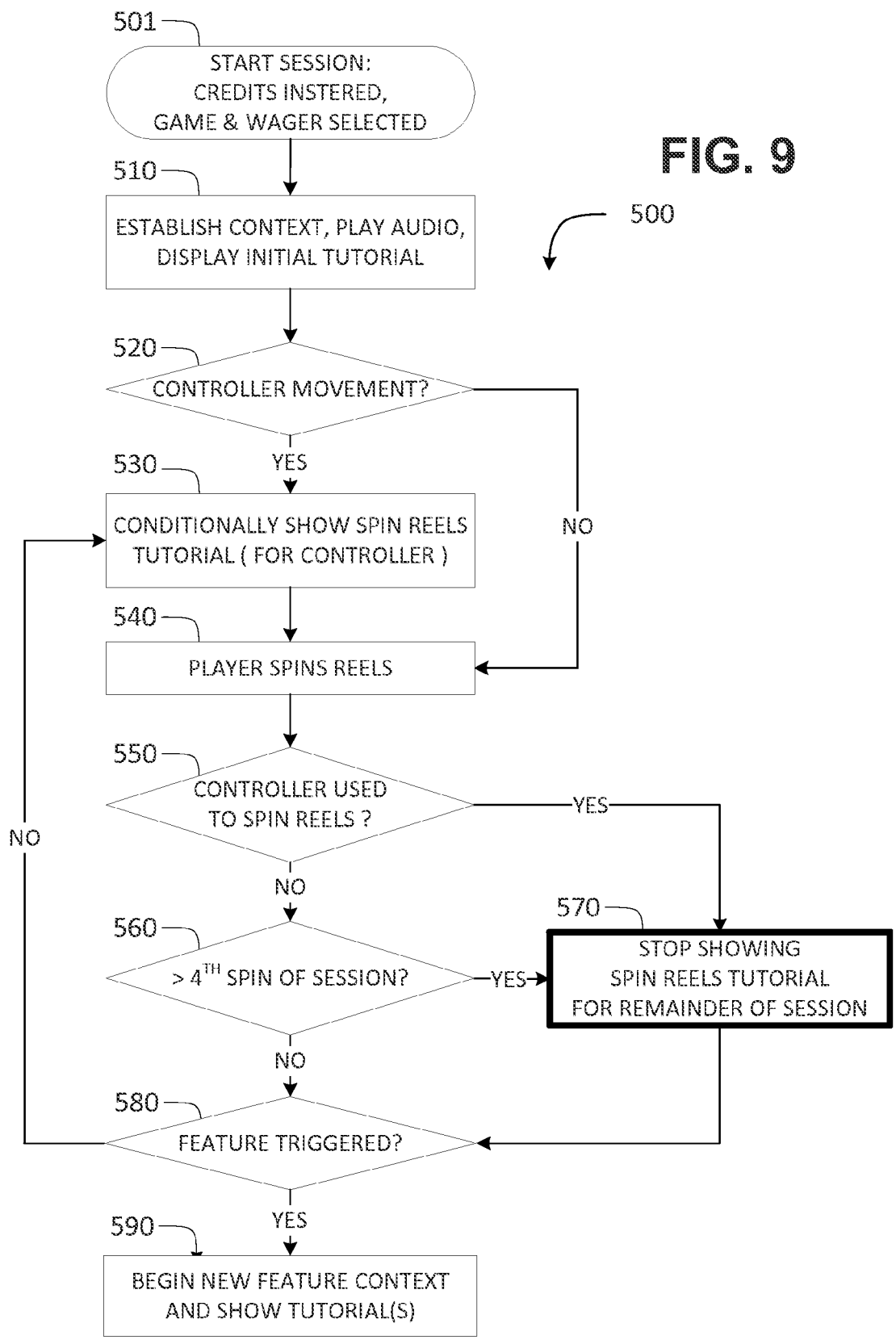
FIG. 9 is a flowchart of a computer-enabled data-processing method for controlling the selective display of intelligent messaging during the operation of a wagering game, according to an embodiment of the present invention, corresponding to instructions executed by a controller in accord with at least some aspects of the disclosed concepts.

Referring now to FIG. 9, a data processing method 500 is shown for performing a wagering game in one embodiment. As an example, one of the wagering game machines 62-64 is used to conduct the wagering game as exemplary, having an operational input device 37 available for player interaction with the wagering game.

In step 501, the process 500 begins when a player establishes a credit balance in one or more of the credits meters (e.g., meter 84), beginning a gaming session. As noted previously, the gaming session will continue until the funds reflected in the credit meter are depleted or a cashout option is exercised by the player, thereby ending the wagering game. A current feature context is defined for the wagering game at this stage. The context refers to the particular details of the gaming feature being performed and may be used by the game-logic circuitry to interpret input and effects of input during the wagering game. A single wagering game may include many different kinds of gaming features, each having a distinct context defining the input types available, associated input device gestures, instructional messages, etc. The wagering game in this embodiment includes a randomly generated and determined symbol-based output displayed on a number of symbol-bearing reels, as discussed prior.

A level of adoption is determined for each input device in the current feature context that the wagering game is operating in. A default level of adoption for the input device controller 37 may be assigned at the beginning of the gaming session if there is no previously determined or known information regarding the player and any familiarity, proficiency, or desirability of the input device. In the event that a player account is used to store a player history with this input device in this feature context, that information is used by the game-logic circuitry to determine a suitable level of adoption relating to the current gaming feature context, input device(s), and player to tailor a level of instructional tutorial messaging during the feature context.

In step 510, in response to establishing a credit balance, selecting a wagering game and wager amount, and preparing engagement in the wagering game, an initial (default) tutorial is presented to the player detailing the use of the input device controller(s) (e.g., input device 37) configured for use in the current gaming context. In one embodiment (referring back to FIG. 1B), prior to a player wagering any credits, the fishing line 38 must be cast into the virtual lake 39 prior to spinning the wagering game reels. A tutorial for this process may be presented to the player via one or more output devices, including video, audio, etc. In another embodiment, a generalized tutorial may be displayed that informs the player of the location and potential usage of the various input devices (including input device 37) of the wagering game machine.

In step 520, a determination is made as to whether the player has physically engaged the input device (e.g., input device 37). Another type of detection (other than physical movement) may be employed, for example, detecting a hand, digits, face, or body by a visual sensor input device used by the wagering game machine to operate feature(s) in the wagering game. In short, this determination checks whether the input device is known, accessible, functional, and engaged with the player of the wagering game.

In step 530, in response to input received from the input device (e.g., input device 37) (indicating that the controller is engaged by the wagering player), tutorial messaging is presented to the player describing how to use the input device controller 37 to spin the reels and initiate a wager in the wagering game in accordance with a level of adoption for the input device and the current feature context. That is, if criteria is met (including evaluations of the level of adoption), a tailored level of tutorial messaging is presented to the player detailing the use of the input device controller for performing actions in the current feature context. In this embodiment, the input device controller tutorial is displayed until the player uses the controller to spin the reels or a total of four reel spins are performed.

In step 540, the player spins the reels to initiate a gaming cycle, thereby committing a wager amount, performing the process of resolving the wager, and displaying an outcome of the wager.

In step 550, a determination is made as to whether the player used the input device controller to spin the reels. In the event that this is the case, there is no need to continue to provide tutorials to instruct the player how to use the controller to achieve this function within this context.

In step 560, if the player has not used the controller to spin the reels, a determination is made as to whether the predetermined number of spins (e.g., four) have been performed, thereby stopping further tutorials regarding use of the controller to spin the reels.

In step 570, if the player has used controller to spin the reels (determined at step 550) or the predetermined number of spins of the session have been performed (and the tutorial presumed shown that many times), an indication is made that causes the tailored instructions for using the controller to spin the reels (i.e., the spin reels tutorial) to cease for the remainder of the session. In one embodiment, this includes modifying the level of adoption to indicate that the criteria of adoption, proficiency, desirability, etc., of the player is such that any further tutorial regarding the use of the input device to perform this particular gesture is unnecessary, redundant, and/or undesirable for the player.

In step 580, a determination is made as to whether the outcome of the spinning of the reels in the wagering game has triggered an additional feature. For example, a bonus-game feature may be triggered by one or more specific symbols being displayed by the symbol-bearing reels as the wagering game outcome is revealed. Thus, a new feature is performed having a new context, potentially having newly available gestures as defined for the input device in the context of the new feature.

In step 590, a level of tailored instructions (i.e., tutorial messages) are presented to the player for the new feature context, again in accordance with any previously defined level of adoption associated with the input device(s), the particular feature context, and the player account. For example, a bonus-game feature (e.g., one or more of the bonus-game features of FIGS. 5-7) are presented and performed having a corresponding level of tailored instruction for the input device controller 37 associated with the appropriate level of adoption for each feature context.

In short, a level of adoption is defined and maintained for each input device, each gesture, each feature, and each player that is engaged with a wagering game machine for a personal or community wagering game. The levels of adoption are used to selectively create a tailored level of instruction that is presented to the corresponding player. When criteria for display or suppression of tutorial messaging is fulfilled, the tailored level of instruction for the wagering game feature context is modified to reduce the presentation of unnecessary, undesirable, or redundant content. The tailored level of instruction may include modular presentation elements that can be combined in different combinations of customized, personalized tutorial using different stimulus. This stimulus can include graphical imagery, textual presentation, animation, audio, programmed lighting, etc., or any combination of these.

The processes 400, 500 described by way of example above, represent independent algorithms that correspond to at least some instructions stored and executed by the game-logic circuitry 40 in FIG. 2 to perform the above described functions associated with the disclosed concepts.

Figure 10:
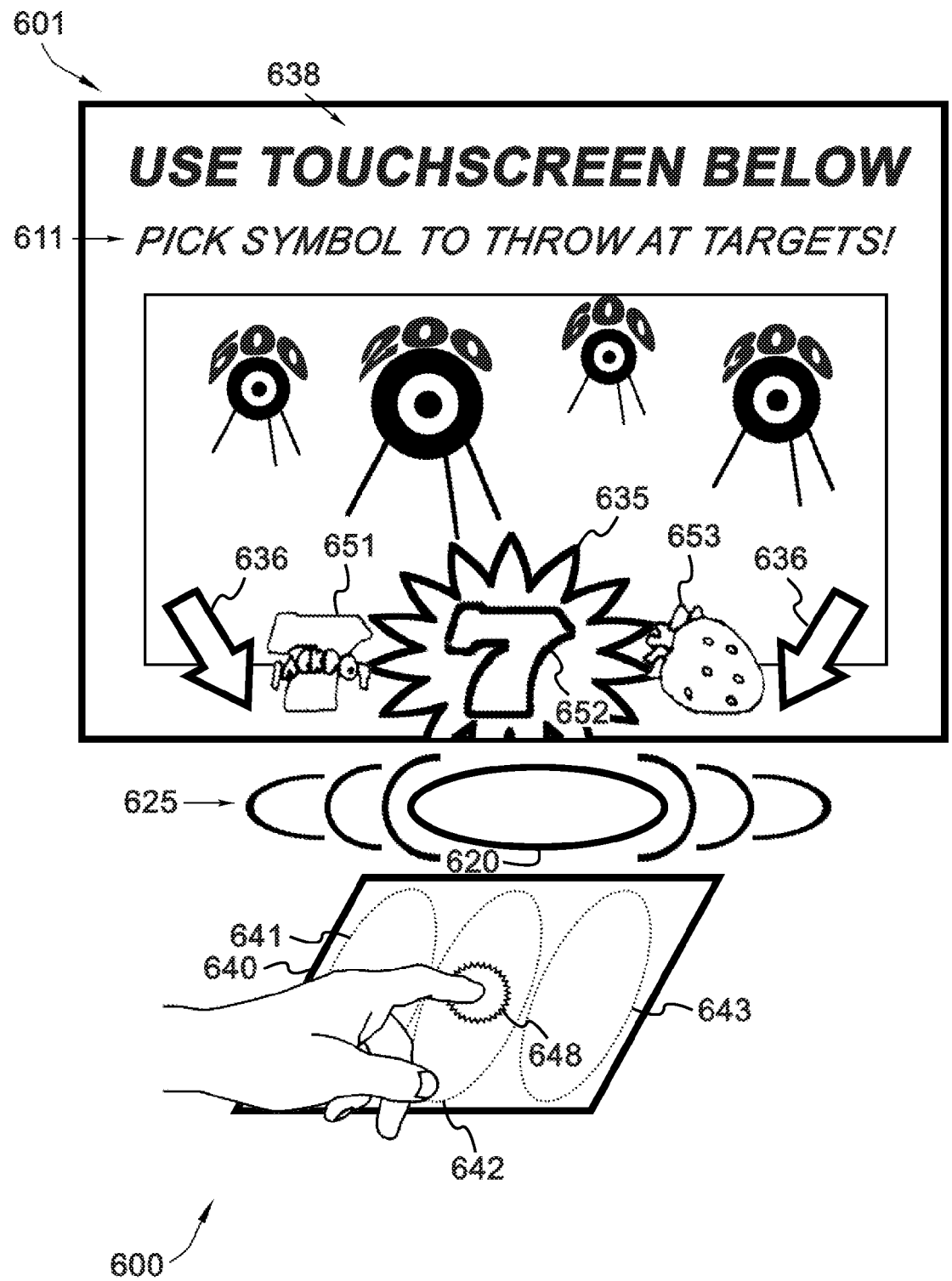
FIG. 10 and FIG. 11 are images of an exemplary gaming system performing a gaming feature utilizing multiple input devices simultaneously, according to an embodiment of the present invention.
Figure 11:
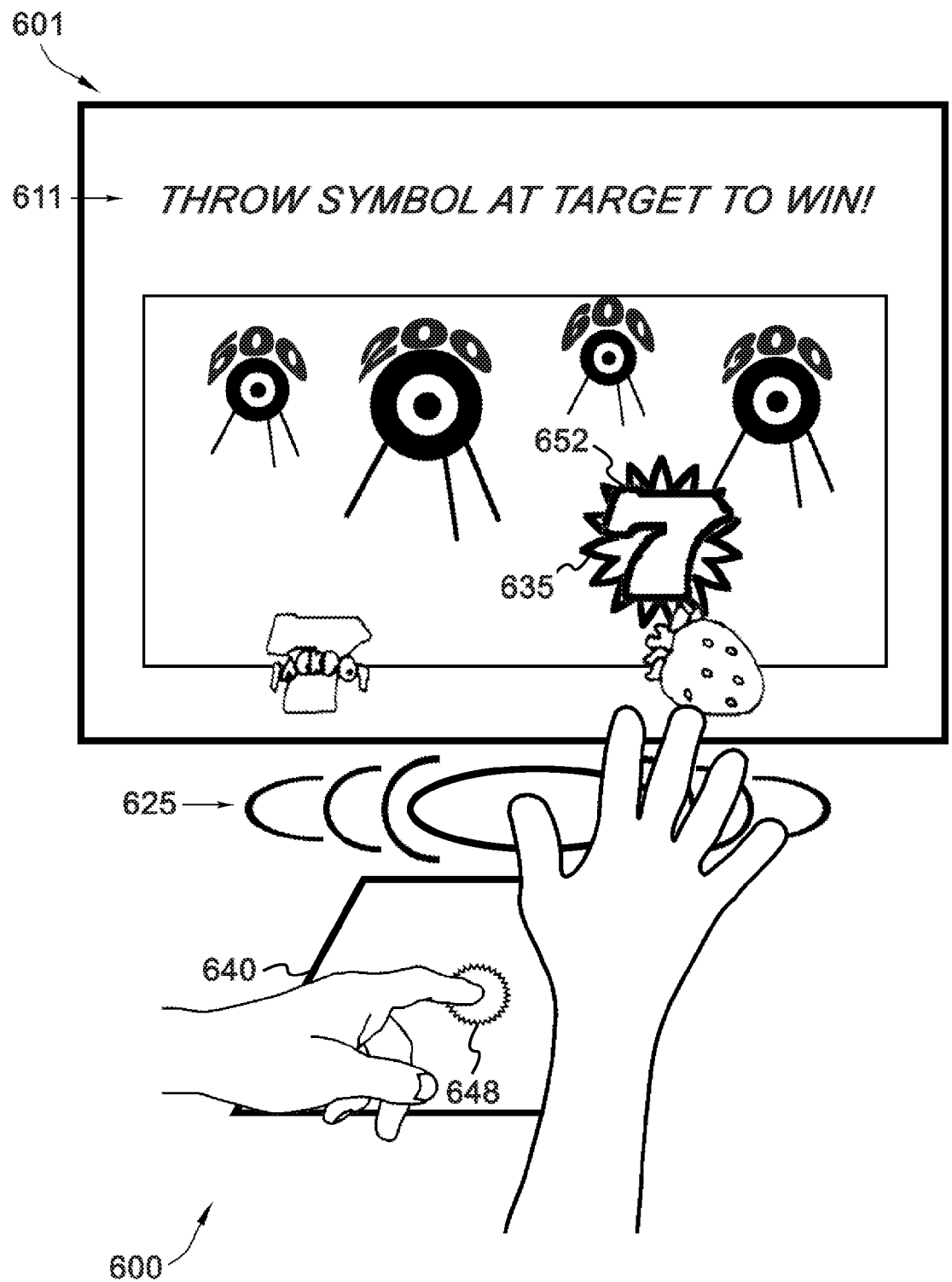

Referring now to FIG. 10 and FIG. 11, a gaming system 600 presenting a bonus-game interface 601 of a wagering-game feature is displayed in one embodiment.

The gaming system 600 includes a bonus-game interface 601 (e.g., presented on the primary display 18 or the secondary display 20 of gaming machine 10), a gesture-sensing motion detector 620, and a touch screen 640. The interface 601 includes a header banner 611, various interface elements 635-638 providing a tailored level of messaging in accordance with a corresponding level of adoption, and a set of feature-specific images 651-653.

The header banner 611 provides textual information to the player regarding the operation of the current feature of the wagering game. The motion detector 620 has a corresponding motion-sensing field 625 that defines an area of space that the player can interact with by providing gesture-based input for operating the feature displayed on the interface 601.

In one embodiment, the feature allows the player to select one of the feature-specific images 651-653 for gesture-based manipulation (e.g., using one hand) while maintaining physical contact with the touch screen 640 (e.g., with one or more fingers of the other hand). The touch screen 640 includes a set of regions 641-643 that correspond to the available feature-specific images 651-653 of the interface 601.

In accordance with the level of adoption, the interface elements 635-638 are displayed to provide a tailored level of instructional messaging by displaying various combinations of the elements 635-638. For example, as the player makes contact with the touch screen 640 at a location 648 in region 642, the corresponding image 652 is highlighted using an interface element 635 to reflect the current selection of the player. Additional elements, including a set of general input device indicators 636 and a textual banner 238. Other additional elements may also be modularly included in accordance with the corresponding level of adoption for the one or more input devices.

In one embodiment, after the touch screen 640 is touched by the player, the level of adoption is immediately changed, in response to the use of the touch screen 640 to operate the feature. In response, the interface 601 changes to display a tailored level of messaging corresponding to the new level of adoption. For example, once the touch screen 640 is engaged by the player, the elements 636 and 638 are removed from the interface 601. In one embodiment, the interface element 635 remains displayed to highlight the selected image 652 corresponding to the region 648 made by the player. The player is now enabled to operate the feature by manipulating the selected image 652 via input received using the sensor field 625. Using a recognized gesture, the player may operate the feature as presented for the wagering game.

Other embodiments may include visual/graphical manipulation of imagery, for example, using detected hand gestures to manipulate the object to observe the object from any angle (by rotating the image as if it was a three-dimensional model), access additional levels of menus or options (e.g., a multi-game menu), make gesture-based selections for the feature or wagering game (e.g., choosing various denominations of wagers or pay tables within a game type, etc.). In one embodiment, releasing contact with the touch screen 640 releases control of the chosen or selected visual object.

Generally, as the level of adoption for a given input device in a given feature context increases, the tailored level of instruction includes a decreasing amount of tutorial messaging. This relationship may be directly inversely proportional. Each moment of the wagering game may be considered as a distinct feature, having a corresponding context, with separate contextualized events that may involve tutorial (or other) messaging to a greater or lesser degree. For example, quick player responses may "increase" a level of adoption indicating proficiency level determinations, while slower player responses may cause a decrease in the level of adoption. The level of adoption (proficiency) refines and changes over time as the player interacts and the tutorial messaging and associated rule sets for displaying tutorial messages may also change to further modify the interaction between the input devices, the player, and the wagering game.

With each moment of player interaction where a gesture is available, a differing set of rules may be used for the type of tutorial messaging. For example, if a player has not yet used a particular input device to operate the feature (e.g., using a wand to spin the reels), the player may still desire to use the input device during a bonus round (in a different context). In one embodiment, these rules persist throughout an entire player gaming session, and may be stored in a player account profile, if available. The rules for gestures, input devices, features, and tutorial messaging could also span across games when a persistent player account is used.

In general, the invention is applicable to any wagering game machine and is agnostic to the input devices used by the wagering game machine to operate and participate in the features of the wagering games. The various types of input devices that may be used include physical and virtual buttons (including touchscreens and visual motion detectors), gesture-based input devices physically held by players (e.g., wands, controllers), gesture-based input devices detecting hand(s), digit(s), face, or body shape and movements, etc., with or without any physical contact to the player or the wagering game machine. The detected and interpreted gestures may be used to control various aspects of a wagering game, including player choices from a field of indicia, actuation of events (e.g., spinning reels), controlling motion of an avatar in a wagering game feature, etc.

Further, through the use of persistent player accounts and evolving session parameters, a more refined interface corresponding to a specific player can be achieved for an advanced player interface for a wagering game and a wagering gaming machine. The ability to minimize unnecessary, undesirable, and redundant presentation content adds a great deal of value to the player experience, satisfaction, and overall perception. These advancements result in player appreciation, increased revenue, and heightened player engagement.

Thus, the proficiency measurements may apply to individual game cycles, game sessions, and may reside in account-based determinations spanning across multiple game machines, etc. A measure of familiarity may also be used, independently with or in conjunction with a measure of proficiency to create an implemented level of adoption. The use of account based familiarity and/or proficiency may result in using longhand tutorial messaging, shorthand messaging, referencing past play performance or events, etc. Other quantifiable features may also be used to provide a tailored level of messaging, e.g., a level of rejection, acceptance, skill, etc., or otherwise impact the level of adoption used to selectively control the amount and type of tutorial messaging.

In one embodiment, in response to newer experiences being presented, the amount and type of messaging is controlled to prompt the player into properly adopting the device. To this end, a set of abstract proficiency levels may be defined (e.g., complete proficiency, intermediate proficiency, novice (low or no exposure) proficiency, no proficiency, and rejected (undesirable). The proficiency/familiarity measurements defining the level of adoption may also include comparison of distinct players based on a series of successful attempts by each player.

Another application occurs in the area of skill-based gaming. For example, if a feature interface and input device has been used prior, the wagering game feature may also change based on measured familiarity, proficiency, previously fulfilled feats of the player, player reaction time, player accuracy, etc. In one embodiment, new wager level(s) may be available for players in response to completed feats (e.g., obtaining a perfect score). Additionally, lower wager level(s) may be additionally or alternatively excluded. Thus, exceeding a minimum level of proficiency may exclude the ability to receive benefits, gaming options (e.g., skill based games), or specific types of messaging (tutorial and otherwise). Specific messaging may be stopped or limited in display or rendering once a particular criteria is fulfilled. In one embodiment, a particular type of message is no longer shown following the player taking a particular action, a timer elapsing, the occurrence of a number of related events, etc. Also, messaging may restart or revert to a default state after a period of inactivity (or player request), having a basic or known familiarity. Further, messaging may further be dynamically modified to correct or guide better interaction with an input device as a result of detected difficulties or shortcomings. For example, in a wagering game context requiring aiming, the user interface may adopt an aiming reticle, a hand or device "shadow", additional imagery, etc.

In one embodiment, a certain criteria may be used in regard to measurements of the player familiarity that change over time and in varying contexts. For example, a specific level of adoption may only be obtainable once a series of feats or levels of proficiencies occur or are repeated during player interaction. Further, gaming events may clear any learned player familiarity knowledge, including player and wagering game resets of the familiarity levels.

The present invention is not limited to instructional and tutorial messaging; the invention generally relates to manipulating and dynamically controlling and changing player interfaces, graphical-user interfaces, and other types of output on a variety of rending devices, including audio and haptic devices.

In one embodiment, the operation of the invention and the associated rules and messaging controlling functionality are part of the wagering game programming (i.e., game-logic circuitry), defined within the game controller. Thus, the rules for controlling levels of adoption and levels of messaging are game-specific and non-alterable.

Once a level of messaging (e.g., tailored level of instruction) is determined for a given context, a similar level of messaging may be translated to other similar contexts. For example, if it takes three modular graphical-user interface tutorial elements to prompt a player to use a particular input device in one context, the same level of modular graphical-user interface elements may be adopted for other contexts to establish an effective level of messaging for the player.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A gaming system, comprising:
a regulated gaming machine primarily dedicated to playing at least one casino wagering game, the gaming machine including an electronic display device, a value-input device, and a plurality of electronic input devices, the plurality of electronic input devices including a first input device and a second input device, the casino wagering game including a first feature alternatively operable by a player using either the first input device or the second input device;
and game-logic circuitry configured to:
detect, via the value-input device, a physical item associated with a monetary value that establishes a credit balance;
initiate the casino wagering game in response to an input indicative of a wager covered by the credit balance;
determine a level of adoption for the player to operate the first feature using the first input device;
in response to the first feature occurring during play of the casino wagering game, display, via the electronic display device, a level of tailored instructions to the player according to the level of adoption, the tailored instructions related to operation of the first feature using the first input device;
receive, via at least one of the first input device or the second input device, an input to operate the first feature;
modify the level of adoption in accordance with a manner in which the first feature is operated by the player; and
receive, via at least one of the one or more electronic input devices, a cashout input that initiates a payout from the credit balance.

2. The gaming system of claim 1, wherein the casino wagering game includes an additional feature that is alternatively operable by the player using either the first input device or the second input device, wherein for the additional feature the game-logic circuitry is configured to:
determine a respective level of adoption for the player to operate the additional feature using the first input device;
in response to the additional feature occurring during play of the casino wagering game, display, via the electronic display device, a respective level of tailored instructions to the player according to the respective level of adoption, the tailored instructions related to operation of the additional feature using the first input device;
receive, via at least one of the first input device or the second input device, an input to operate the additional feature; and
modify the respective level of adoption m accordance with a manner in which the additional feature is operated by the player.

3. The gaming system of claim 1, wherein the game-logic circuitry is configured to set the level of adoption to a default level in response to the credit balance being established.

4. The gaming system of claim 1, wherein the level of adoption by the player is maintained in a player account.

5. The gaming system of claim 1, wherein the level of tailored instructions corresponds to a specific combination of one or more modular presentation elements having different stimulus including text, animation, lighting, and audio.

6. The gaming system of claim 1, wherein the level of tailored instructions to the player is inversely proportional to the level of adoption.

7. The gaming system of claim 1, wherein the first input device is a gesture-based input device that detects a directional motion of the player and the second input device is an input device that requires an actuating physical contact with a touchscreen, button, or joystick.

8. The gaming system of claim 7, wherein the gesture-based input device includes at least one of a motion-sensing hand-held device or a hands-only-aspect sensor.

9. The gaming system of claim 1, wherein the first feature includes at least one of a reel spin or pick effectuated by the input to operate the first feature.

10. A method of operating a gaming system, the gaming system including game-logic circuitry and a regulated gaming machine, the gaming machine primarily dedicated to playing at least one casino wagering game, the gaming machine including an electronic display device, a value-input device, and a plurality of electronic input devices, the plurality of electronic input devices including a first input device and a second input device, the casino wagering game including a first feature alternatively operable by a player using either the first input device or the second input device, the method comprising:

detecting, via the value-input device, a physical item associated with a monetary value that establishes a credit balance;

initiating the casino wagering game in response to an input indicative of a wager covered by the credit balance;

determining, via the game-logic circuitry, a level of adoption for the player to operate the first feature using the first input device;

in response to a first occurrence of the first feature during play of the casino wagering game, displaying, via the electronic display device, a level of tailored instructions to the player according to the level of adoption, the tailored instructions related to operation of the first feature using the first input device;

receiving, via at least one of the first input device or the second input device, an input to operate the first feature at the first occurrence;

modifying, via the game-logic circuitry, the level of adoption in accordance with a manner in which the first feature is operated by the player at the first occurrence;

in response to a second occurrence of the first feature during play of the casino wagering game, displaying, via the electronic display device, a level of tailored instruction to the player according to the modified level of adoption; and receiving, via at least one of the one or more electronic input devices, a cashout input that initiates a payout from the credit balance.

11. The method of claim 10, wherein the casino wagering game includes an additional feature that is alternatively operable by a player using either the first input device or the second input device, the method further comprising:

determining, via the game-logic circuitry, a respective level of adoption for the player to operate the additional feature using the first input device;

in response to the additional feature occurring during play of the casino wagering game, displaying, via the electronic display device, a respective level of tailored instructions to the player according to the respective level of adoption, the tailored instructions related to operation of the corresponding additional feature using the first input device;

receiving, via at least one of the first input device or the second input device, an input to operate the additional feature; and modifying, via the game-logic circuitry, the respective level of adoption in accordance with a manner in which the additional feature is operated by the player.

12. The method of claim 10, wherein the level of tailored instructions corresponds to a specific combination of one or more modular presentation elements having different stimulus including text, animation, lighting, and audio.

13. The method of claim 10, wherein the level of tailored instructions to the player is inversely proportional to the level of adoption.

14. The method of claim 10, wherein the first input device is a gesture-based input device that detects a directional motion of the player and the second input device is an input device that requires an actuating physical contact with a touchscreen, button, or joystick.

15. A method of operating a gaming system, the gaming system including game-logic circuitry and a plurality of regulated gaming machines, each gaming machine primarily dedicated to playing at least one respective casino wagering game and configured to participate in a community event, each gaming machine including an electronic display device, a value input device, and a plurality of electronic input devices, the plurality of electronic input devices including a first input device and a second input device, each respective casino wagering game including a first feature alternatively operable by a respective player using either the first input device or the second input device of the respective gaming machine, the method comprising:

detecting, via the value-input device of the respective gaming machine, a physical item associated with a monetary value that establishes a credit balance;

initiating the casino wagering game on the respective gaming machine in response to an input indicative of a wager covered by the credit balance;

determining, via the game-logic circuitry, a current level of adoption for the respective player to operate the first feature using the first input device of the respective gaming machine;

in response to the first feature occurring during play of the casino wagering game on the respective gaming machine, displaying, via the electronic display device of the respective gaining machine, a level of tailored instructions to the respective player according to the current level of adoption, the tailored instructions related to operation of the first feature using the first input device of the respective gaming machine;

receiving, via at least one of the first input device or the second input device of the respective gaining machine, an input to operate the first feature;

modifying, via the game-logic circuitry, the current level of adoption in accordance with a manner in which the first feature is operated by the respective player; and receiving, via at least one of the one or more electronic input devices of the respective gaming machine, a cashout input that initiates a payout from the credit balance.

16. The method of claim 15, wherein the casino wagering game includes one or more additional features that are alternatively operable by a respective player using either the first input device or the second input device of the respective gaming machine, the method further comprising:

determining, via the game-logic circuitry, a secondary current level of adoption by the respective player to operate each additional feature using the first input device of the respective gaming machine;

in response to each additional feature occurring during play of the casino wagering game, displaying, via the electronic display device on the respective gaming machine, a respective level of tailored instructions to the respective player according to the secondary current level of adoption, the tailored instructions related to operation of the corresponding additional feature using the first input device of the respective gaming machine;

receiving, via at least one of the first input device or the second input device of the respective gaming machine, an input to operate the feature; and modifying, via the game-logic circuitry, the secondary current level of adoption in accordance with a manner in which the feature is operated by the respective player.

17. The method of claim 15, wherein the level of tailored instructions corresponds to a specific combination of one or more modular presentation elements having different stimulus including text, animation, lighting, and audio.

18. The method of claim 15, wherein the level of tailored instructions to the player is inversely proportional to the current level of adoption.

19. The method of claim 15, wherein the first input device is a gesture-based input device that detects a directional motion of the player and the second input device is an input device that requires an actuating physical contact with a touchscreen, button, or joystick.

20. The method of claim 19, wherein the gesture-based input device includes at least one of a hand-held wand or a hands-only-aspect sensor and the first feature includes at least one of a reel spin or pick effectuated by the input to operate the first feature.

* * * * *